(12) United States Patent
Kumar et al.

(10) Patent No.: US 11,005,968 B2
(45) Date of Patent: May 11, 2021

(54) FABRIC SUPPORT FOR QUALITY OF SERVICE

(71) Applicant: Intel Corporation, Santa Clara, CA (US)

(72) Inventors: Karthik Kumar, Chandler, AZ (US); Francesc Guim Bernat, Barcelona (ES); Thomas Willhalm, Sandhausen (DE); Raj K. Ramanujan, Federal Way, WA (US); Andrew J. Herdrich, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 15/435,371

(22) Filed: Feb. 17, 2017

(65) Prior Publication Data

US 2018/0241842 A1 Aug. 23, 2018

(51) Int. Cl.
*H04L 29/08* (2006.01)
*H04L 12/861* (2013.01)
*H04L 12/927* (2013.01)
*H04L 12/801* (2013.01)

(52) U.S. Cl.
CPC .......... *H04L 67/322* (2013.01); *H04L 47/805* (2013.01); *H04L 49/9068* (2013.01); *G01N 2201/1266* (2013.01); *G05B 2219/25019* (2013.01); *H04L 47/18* (2013.01)

(58) Field of Classification Search
CPC .......... G06F 15/173; G06F 9/44; G06F 17/30; G06F 9/455; H04L 29/06; H04L 12/46; H04L 12/801; H04L 12/26
See application file for complete search history.

(56) References Cited

U.S. PATENT DOCUMENTS

| | | | | |
|---|---|---|---|---|
| 8,165,021 | B2 * | 4/2012 | Jogalekar | H04L 47/10 370/230 |
| 2007/0250630 | A1 * | 10/2007 | Blanding | G06F 9/00 709/226 |
| 2012/0166618 | A1 * | 6/2012 | Dahod | H04W 28/02 709/224 |
| 2014/0136710 | A1 * | 5/2014 | Benari | G06F 9/5061 709/226 |
| 2014/0169788 | A1 * | 6/2014 | Hussain | H04B 10/27 398/43 |
| 2016/0182345 | A1 * | 6/2016 | Herdrich | G06F 12/084 709/224 |
| 2016/0381124 | A1 * | 12/2016 | Hwang | H04L 43/0817 709/226 |
| 2017/0024352 | A1 * | 1/2017 | Lavasani | G06F 13/36 |
| 2017/0090987 | A1 * | 3/2017 | Hearn | G06F 9/4881 |
| 2018/0091410 | A1 * | 3/2018 | Browne | H04L 41/5009 |
| 2018/0131578 | A1 * | 5/2018 | Cui | H04L 49/70 |
| 2018/0176181 | A1 * | 6/2018 | Fu | H04L 63/101 |
| 2019/0205244 | A1 * | 7/2019 | Smith | G06F 12/12 |

* cited by examiner

*Primary Examiner* — Aftab N. Khan
(74) *Attorney, Agent, or Firm* — Patent Capital Group

(57) ABSTRACT

There is disclosed in an example, a fabric interface device, having: a fabric interconnect to communicatively couple to a fabric; service level agreement (SLA) input logic to receive an SLA data structure from a controller, the SLA data structure providing an end-to-end SLA for a resource flow provided by a plurality of resources, and comprising QoS metrics for the resources; and SLA output logic to propagate the QoS metrics out to the resources via the fabric interconnect.

25 Claims, 19 Drawing Sheets

FABRIC SUPPORT FOR QUALITY OF SERVICE

FIELD OF THE SPECIFICATION

This disclosure relates in general to the field of cloud computing, and more particularly, though not exclusively to, a system and method for fabric support for quality of service.

BACKGROUND

Contemporary computing practice has moved away from hardware-specific computing and toward "the network is the device." A contemporary network may include a datacenter hosting a large number of generic hardware server devices, contained in a server rack for example, and controlled by a hypervisor. Each hardware device may run one or more instances of a virtual device, such as a workload server or virtual desktop.

In some cases, a virtualized network may also include network function virtualization (NFV), which provides certain network functions as virtual appliances. These functions may be referred to as virtual network functions (VNFs). In the past, the functions provided by these VNFs may have been provided by bespoke hardware service appliances.

Thus, in a contemporary "cloud" architecture, both network endpoints and network infrastructure may be at least partially provided in a virtualization layer.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1A:
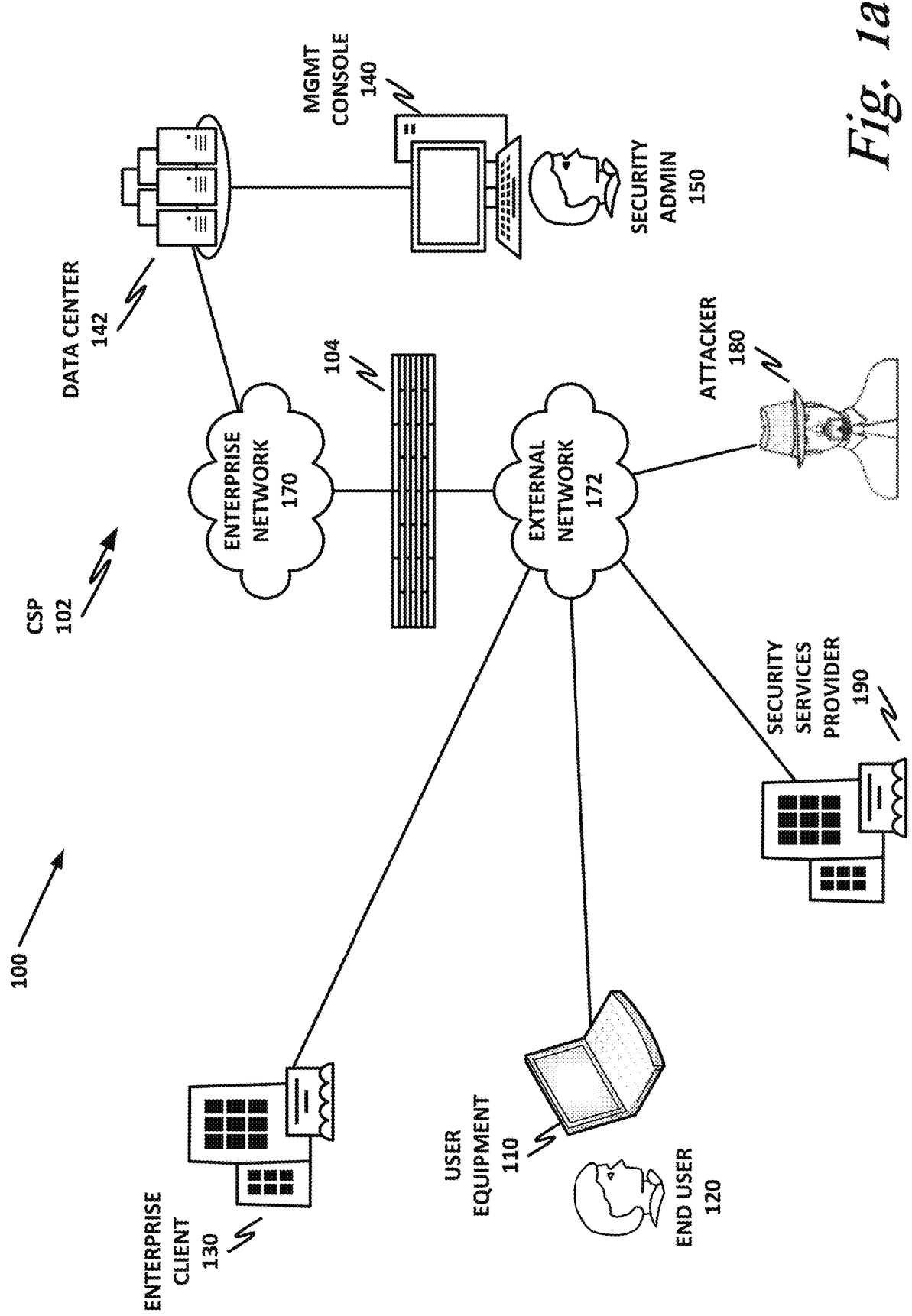
FIG. 1a is a block diagram of a network according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In cloud environments, the concept of "ownership" of a specific resource may be subsumed by service level agreements (SLAs). Specifically, the cloud service provider may contract with a client to make available certain resources, which may include a number of cores or processors with specific capabilities, a minimum allocation of memory and storage, and a minimum data bandwidth. The client is not so much concerned about which processors are allocated, which specific hard drives are allocated, or which interconnects are allocated, so long as the SLA is met.

Like many concepts in a cloud infrastructure, this SLA may be, at least in part, abstracted from low-level details. For example, one "tenant" in a datacenter may have an SLA that requires one terabyte of memory with a minimum bandwidth of two gigabits per second. However, realizing that, the SLA may, in fact, require certain minimum end-to-end performance that implicates a number of intermediate resources in the chain between the processor and a storage pool. These may include, by way of nonlimiting example, a local cache, a host fabric interface (HFI), the fabric itself, an HFI on the storage controller, allocation of bandwidth on the storage controller, and allocation of data services.

Each of these resources may have a necessary allocation to meet the overall SLA, and the type of allocation may be different for each resource. Thus, to ensure that the end-to-end SLA is met, a resource with a global view of the system, such as an orchestrator, may look to each individual resource and determine what is the minimum allocation required to meet the end-to-end SLA. The orchestrator may build from this view a data structure that includes minimum resource allocations for each of the resources in the chain. The orchestrator then sends this data structure to the host device that is required to provide the SLA.

In an example, the host device has an HFI with an SLA input engine and an SLA output engine. The SLA input engine includes logic elements for receiving from the orchestrator the data structure including the individual resource allocations for meeting the SLA. The SLA output engine includes logic elements for parsing out the individual requirements, and propagating those requirements out to the individual resources via the fabric.

Multitenancy is a system in which multiple applications operate in a shared environment, including virtualization, containers, application servers on Java virtual machines (JVMs), and similar. Multitenancy is becoming increasingly common in enterprise and cloud systems, and provides some advantages. However, multitenancy also presents additional challenges in managing SLAs.

For example, consider the case of three applications A, B, and C, running in a platform. The required response time for application C is X milliseconds. It may be that application C is not very CPU or memory intensive, but requires a certain dedicated slice of the last level cache (LLC) to meet the response time SLA. If A or B were cache intensive (even temporarily), it could result in C missing its SLA, thus defeating the benefits of multitenancy.

Some benefit is gained by providing hardware quality of service (QoS) metrics and enforcement. For example, cache QoS can be used to dedicate slices of the LLC to a particular application, and a memory bandwidth QoS may be used for memory arbitration on a single node.

But in modern practice, it is increasingly true that "the datacenter is the computer." Several factors contribute to this trend. For example, an increase in data volumes and application footprints makes it desirable for applications to scale-out to multiple machines instead of scaling up to larger or more capable machines. Improvements in fabric and network technology make the interconnect between machines a viable low-latency data bus for such applications. And the emergence of shared resource pools connected to the fabric, including for example the "networked bunch of disks" (NBOD) as a storage pool and dedicated memory servers. Also, note that a shared resource can also include software. For example, a database server may service requests from several application servers, with some being more critical than others.

With shared resources, arbitration becomes critical. For example, a 3D crosspoint (3DXP) memory server could be connected to the system via the fabric, and different applications can request and map memory from this memory server onto their address spaces. Here, the same problem of one misbehaving application resulting in other applications missing their SLAs can arise. The disputed access to these shared resources may result in poor or unpredictable behaviors, or non-uniform and long latency tails for the resource request. Ultimately, this can result in high priority requests suffering from starvation.

As a solution, the concept of node-level QoS can be applied to scale-out architectures (aka datacenter QoS), but poses some additional challenges. At the node level, the processor can function as an entity that serves as a single point of control, but at the datacenter level, the point of control is different (for example, the point of control may be the HFI). Thus, novel logic and data structures may be provided in the HFI to implement the control.

This may also require a fabric-level protocol or mechanism to enable exposure of resources, input of SLA/QoS requirements, and a mechanism to propagate the SLA scheme out to the datacenter.

In describing the present architecture, the following nonexhaustive and nonlimiting list of definitions may be beneficial.

Caching Agents (CA) are the coherency agents within a node that process memory requests from the cores within the same node. In current architectures, cores use the Super Queue (SQ) structure to store on-die interconnect requests that are sent to the CA (e.g., all the different loads that the core sent to the CA).

Home Agents (HA) are the node clusters that are responsible for processing memory requests from the caching agents, and act as a "home" for part of the memory address space (one die can have multiple homes having a distributed address space mapping). Depending on the address space the requests are targeting, they may go to the same node's local memory, they may go the Ultra Path Interconnect (UPI) agent (formerly called QPI or KTI) to route the request to the other processors within the same coherent domain, or they may go through the HFI to structures that are outside the coherent domain. All the processors connected through UPI belong to the same coherent domain. One system can include one or more coherent domains, with all the coherent domains connected through a fabric interconnect. For example, high performance computing (HPC) or data centers include N clusters or servers that can communicate with each other utilizing the fabric. Using the fabric (like STL), each coherent domain can expose some address regions to the other coherent domains. The HFI may provide access to traditional node architectures and may provide access to newer types of resources, such as pooled resources and accelerators.

A system and method for fabric support for quality of service will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1a is a network-level diagram of a network 100 according to one or more examples of the present specification. In the example of FIG. 1a, network 100 may be configured to enable one or more enterprise clients 130 to provide services or data to one or more end users 120, who may operate user equipment 110 to access information or services via external network 172. This example contemplates an embodiment in which a cloud service provider 102 is itself an enterprise that provides third-party "network as a service" (NaaS) services to enterprise client 130. However, this example is nonlimiting. Enterprise client 130 and cloud service provider (CSP) 102 could also be the same or a related entity in appropriate embodiments.

FIG. 1a is a network-level diagram of a network 100 of a CSP 102 according to one or more examples of the present specification. In the example of FIG. 1a, network 100 may be configured to enable one or more enterprise clients 130 to provide services or data to one or more end users 120, who may operate user equipment 110 to access information or services via external network 172. This example contemplates an embodiment in which a cloud service provider 102 is itself an enterprise that provides third-party "network as a service" (NaaS) to enterprise client 130. However, this example is nonlimiting. Enterprise client 130 and CSP 102 could also be the same or a related entity in appropriate embodiments.

Enterprise network 170 may be any suitable network or combination of one or more networks operating on one or more suitable networking protocols, including, for example, a fabric, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within datacenter 142. In this illustration, enterprise network 170 is shown as a single network for simplicity, but in some embodiments, enterprise network 170 may include a large number of networks, such as one or more enterprise intranets connected to the internet, and may include datacenters in a plurality of geographic locations. Enterprise network 170 may also provide access to an external network, such as the Internet, via external network 172. External network 172 may similarly be any suitable type of network.

A datacenter 142 may be provided, for example as a virtual cluster running in a hypervisor on a plurality of rackmounted blade servers, or as a cluster of physical servers. Datacenter 142 may provide one or more server functions, one or more VNFs, or one or more "microclouds" to one or more tenants in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors. In some embodiments, datacenter 142 may also provide multitenancy, in which a single instance of a function may be provided to a plurality of tenants, with data for each tenant being insulated from data for each other tenant.

It should also be noted that some functionality of user equipment 110 may also be provided via datacenter 142. For example, one microcloud may provide a remote desktop hypervisor such as a Citrix workspace, which allows end users 120 to remotely log in to a remote enterprise desktop and access enterprise applications, workspaces, and data. In that case, UE 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may be a special case of user equipment, and may provide a user interface for a security administrator 150 to define enterprise security and network policies, which management console 140 may enforce on enterprise network 170 and across client devices 110 and datacenter 142. In an example, management console 140 may run a server-class operating system, such as Linux, Unix, or Windows Server. In another case, management console 140 may be provided as a web interface, on a desktop-class machine, or via a VM provisioned within datacenter 142.

Network 100 may communicate across enterprise boundary 104 with external network 172. Enterprise boundary 104 may represent a physical, logical, or other boundary. External network 172 may include, for example, websites, servers, network protocols, and other network-based services. CSP 102 may also contract with a third-party security services provider 190, such as McAfee® or another security services enterprise, to provide security services to network 100.

It may be a goal of enterprise clients to securely provide network services to end users 120 via datacenter 142, as hosted by CSP 102. To that end, CSP 102 may provide certain contractual quality of service (QoS) guarantees and/ or service level agreements (SLA). QoS may be a measure of resource performance, and may include factors such as availability, jitter, bit rate, throughput, error rates, and latency, to name just a few. An SLA may be a contractual agreement that may include QoS factors, as well as factors such as "mean time to recovery" (MTTR) and mean time between failure (MTBF). In general, an SLA may be a higher-level agreement that is more relevant to an overall experience, whereas QoS may be used to measure the performance of individual components. However, this should not be understood as implying a strict division between QoS metrics and SLA metrics.

Figure 1B:
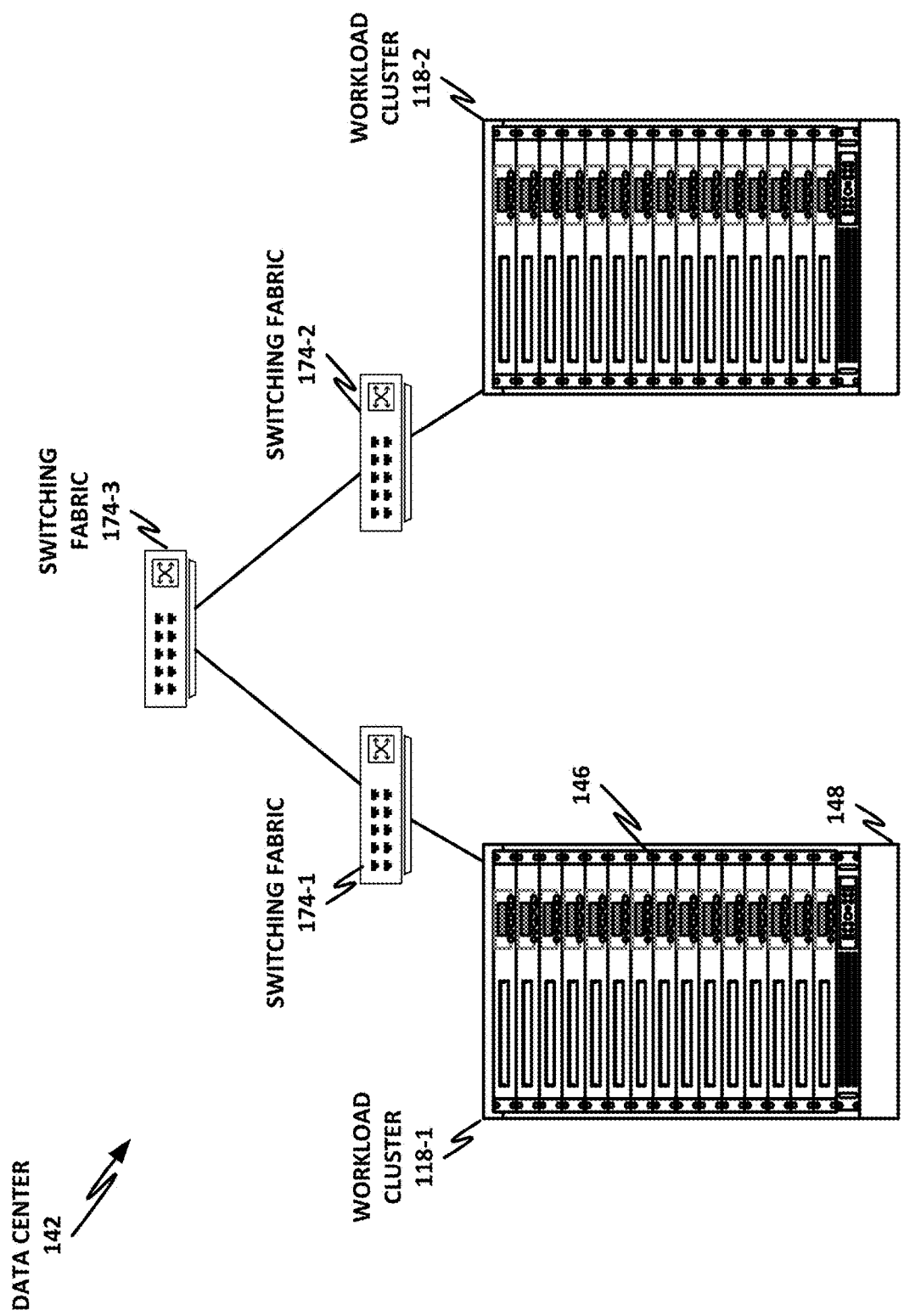
FIG. 1b is a block diagram of selected components of a datacenter in the network.

Turning to FIG. 1b, to meet contractual QoS and SLA requirements, CSP 102 may provision some number of workload clusters 118. In this example, two workload clusters, 118-1 and 118-2 are shown, each providing up to 16 rackmount servers 146 in a chassis 148. These server racks may be collocated in a single datacenter, or may be located in different geographic datacenters. Depending on the contractual agreements, some servers 146 may be specifically dedicated to certain enterprise clients or tenants, while others may be shared.

Selection of a number of servers to provision in a datacenter is a nontrivial exercise for CSP 102. CSP 102 may wish to ensure that there are enough servers to handle network capacity, and to provide for anticipated device failures over time. However, provisioning too many servers 146 can be costly both in terms of hardware cost, and in terms of power consumption. Thus, ideally, CSP 102 provisions enough servers 146 to service all of its enterprise clients 130 and meet contractual QoS and SLA benchmarks, but not have wasted capacity.

The various devices in datacenter 142 may be connected to each other via a switching fabric 174, which may include one or more high speed routing and/or switching devices. In some cases, switching fabric 174 may be hierarchical, with, for example, switching fabric 174-1 handling workload cluster 118-1, switching fabric 174-2 handling workload cluster 118-2, and switching fabric 174-3. This simple hierarchy is shown to illustrate the principle of hierarchical switching fabrics, but it should be noted that this may be significantly simplified compared to real-life deployments. In many cases, the hierarchy of switching fabric 174 may be multifaceted and much more involved. Common network architectures include hub-and-spoke architectures, and leaf-spine architectures.

The fabric itself may be provided by any suitable interconnect, such as Intel® Omnipath™, TrueScale™, Ultra Path Interconnect (UPI) (formerly called QPI or KTI), STL, Ethernet, PCI, or PCIe, to name just a few. Some of these will be more suitable for certain types of deployments than others, and selecting an appropriate fabric for the instant application is an exercise of ordinary skill.

Figure 2:
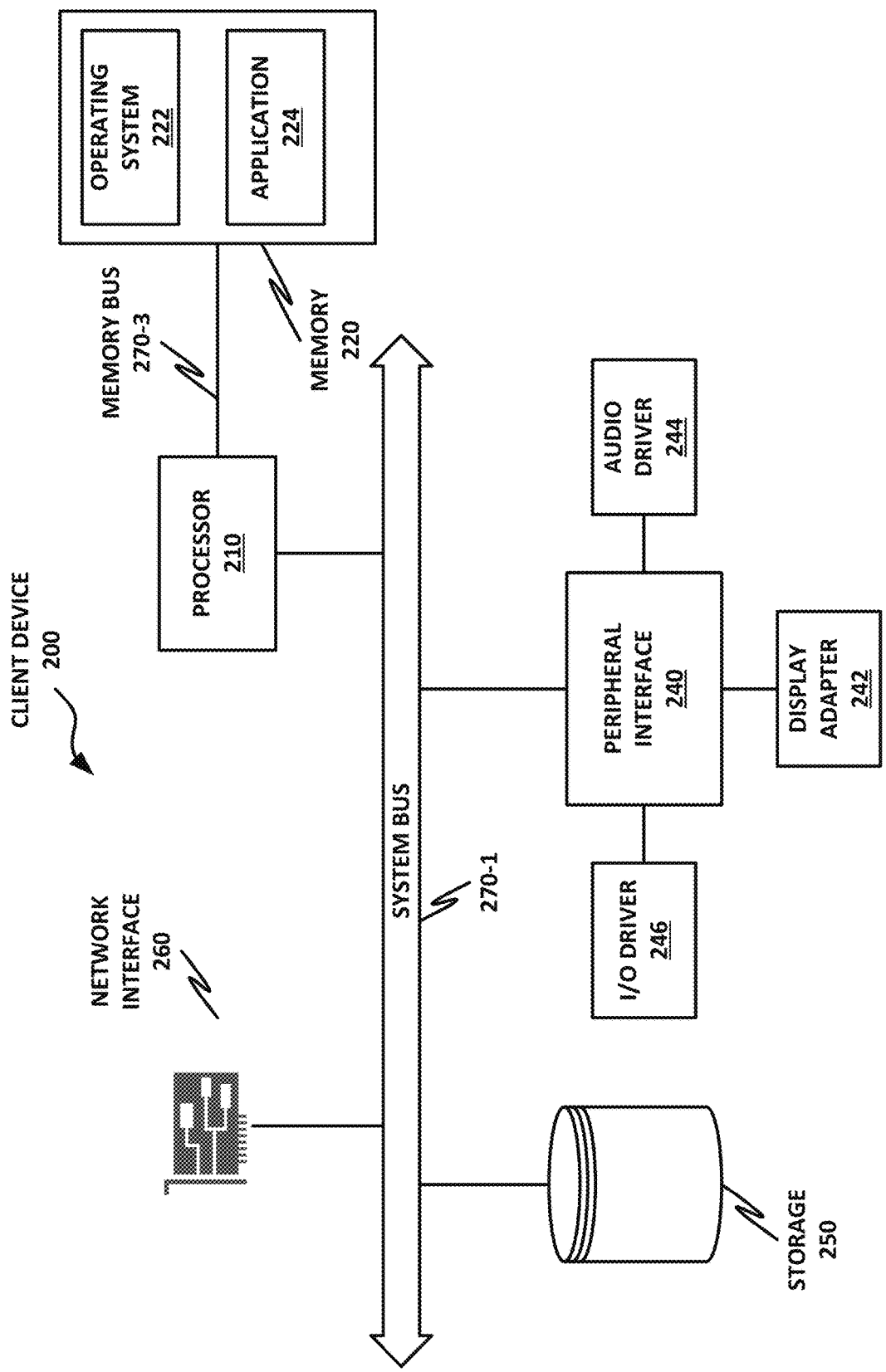
FIG. 2 is a block diagram of selected components of an end-user computing device according to one or more examples of the present specification.

FIG. 2 is a block diagram of client device 200 according to one or more examples of the present specification. Client device 200 may be any suitable computing device. In various embodiments, a "computing device" may be or comprise, by way of nonlimiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In particular, user equipment 110 may be a client device 200, and in one particular example, client device 200 is a virtual machine configured for remote direct memory access (RDMA), as described herein.

Client device 200 includes a processor 210 connected to a memory 220, having stored therein executable instructions for providing an operating system 222 and at least software portions of an application 224. Other components of client device 200 include a storage 250, network interface 260, and peripheral interface 240. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices, such as in the case of a datacenter storage pool or memory server. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block.

As used throughout this specification, "logic elements" may include hardware (including, for example, a programmable software, ASIC, or FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, nontransitory computer-readable medium having stored thereon executable instructions for instructing a processor to perform a certain task. Such a nontransitory medium could include, for example, a hard disk, solid state memory or disk, read-only memory (ROM), persistent fast memory (PFM) (e.g., Intel® 3D Crosspoint), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into a field-programmable gate array (FPGA), or encoded in hardware on an application-specific integrated circuit (ASIC) or processor.

In an example, processor 210 is communicatively coupled to memory 220 via memory bus 270-3, which may be, for example, a direct memory access (DMA) bus by way of example, though other memory architectures are possible, including ones in which memory 220 communicates with processor 210 via system bus 270-1 or some other bus. In datacenter environments, memory bus 270-3 may be, or may include, the fabric.

Processor 210 may be communicatively coupled to other devices via a system bus 270-1. As used throughout this specification, a "bus" includes any wired or wireless interconnection line, network, connection, fabric, bundle, single bus, multiple buses, crossbar network, single-stage network, multistage network, or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including, by way of nonlimiting example, a microprocessor, digital signal processor (DSP), field-programmable gate array (FPGA), graphics processing unit (GPU), programmable logic array (PLA), application-specific integrated circuit (ASIC), or virtual machine processor. In certain architectures, a multicore processor may be provided, in which case processor 210 may be treated as only one core of a multicore processor, or may be treated as the entire multicore processor, as appropriate. In some embodiments, one or more coprocessors may also be provided for specialized or support functions.

Processor 210 may be connected to memory 220 in a DMA configuration via bus 270-3. To simplify this disclosure, memory 220 is disclosed as a single logical block, but in a physical embodiment may include one or more blocks of any suitable volatile or nonvolatile memory technology or technologies, including, for example, double date rate random access memory (DDR RAM), static random access memory (SRAM), dynamic random access memory (DRAM), persistent fast memory (PFM) (such as Intel® 3D crosspoint, or 3DXP), cache, L1 or L2 memory, on-chip memory, registers, flash, ROM, optical media, virtual memory regions, magnetic or tape memory, or similar. Memory 220 may be provided locally, or may be provided elsewhere, such as in the case of a datacenter with a 3DXP memory server. In certain embodiments, memory 220 may comprise a relatively low-latency volatile main memory, while storage 250 may comprise a relatively higher-latency nonvolatile memory. However, memory 220 and storage 250 need not be physically separate devices, and in some examples may represent simply a logical separation of function. These lines can be particularly blurred in cases where the only long-term memory is a batter-backed RAM, or where the main memory is provided as PFM. It should also be noted that although DMA is disclosed by way of nonlimiting example, DMA is not the only protocol consistent with this specification, and that other memory architectures are available.

Operating system 222 may be provided, though it is not necessary in all embodiments. For example, some embedded systems operate on "bare metal" for purposes of speed, efficiency, and resource preservation. However, in contemporary systems, it is common for even minimalist embedded systems to include some kind of operating system. Where it is provided, operating system 222 may include any appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. Embedded devices often use an embedded Linux or a dedicated embedded OS such as VxWorks. However, these examples are not intended to be limiting.

Storage 250 may be any species of memory 220, or may be a separate nonvolatile memory device. Storage 250 may include one or more nontransitory computer-readable mediums, including by way of nonlimiting example, a hard drive, solid-state drive, external storage, redundant array of independent disks (RAID), redundant array of independent nodes (RAIN), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of application 224. In some examples, storage 250 may be a nontransitory computer-readable storage medium that includes hardware instructions or logic encoded as processor instructions or on an ASIC. Many other configurations are also possible, and are intended to be encompassed within the broad scope of this specification.

Network interface 260 may be provided to communicatively couple client device 200 to a wired or wireless network. A "network," as used throughout this specification, may include any communicative platform or medium operable to exchange data or information within or between computing devices, including by way of nonlimiting example, Ethernet, WiFi, a fabric, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment. Note that in certain embodiments, network interface 260 may be, or may include, a host fabric interface (HFI).

Application 224, in one example, is operable to carry out computer-implemented methods as described in this specification. Application 224 may include one or more tangible nontransitory computer-readable mediums having stored thereon executable instructions operable to instruct a processor to provide an application 224. Application 224 may also include a processor, with corresponding memory instructions that instruct the processor to carry out the desired method. As used throughout this specification, an "engine" includes any combination of one or more logic elements, of similar or dissimilar species, operable for and configured to perform one or more methods or functions of the engine. In some cases, application 224 may include a special integrated circuit designed to carry out a method or a part thereof, and may also include software instructions operable to instruct a processor to perform the method. In some cases, application 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, basic input/output system (BIOS) subroutine, or any similar program that operates without direct user interaction. In certain embodiments, daemon processes may run with elevated privileges in a "driver space" associated with ring 0, 1, or 2 in a protection ring architecture. It should also be noted that application 224 may also include other hardware and software, including configuration files, registry entries, and interactive or user-mode software by way of nonlimiting example.

In one example, application 224 includes executable instructions stored on a nontransitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of application 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage by way of nonlimiting example.

In one example, peripherals include display adapter 242, audio driver 244, and input/output (IO) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, video graphics array (VGA), or digital outputs such as digital video interface (DVI) or high-definition multimedia interface (HDMI), by way of nonlimiting example. In some examples, display adapter 242 may include a hardware graphics card, which may have its own memory and its own graphics processing unit (GPU). Audio driver 244 may provide an interface for audible sounds, and may include, in some examples, a hardware sound card. Sound output may be provided in analog (such as a 3.5 mm stereo jack), component ("RCA") stereo, or in a digital audio format such as Sony/Philips Digital Interface Format (S/PDIF), AES3, AES47, HDMI, USB, Bluetooth or Wi-Fi audio, by way of nonlimiting example. Note that in embodiments where client device 200 is a virtual machine, peripherals may be provided remotely by a device used to access the virtual machine.

Figure 3:
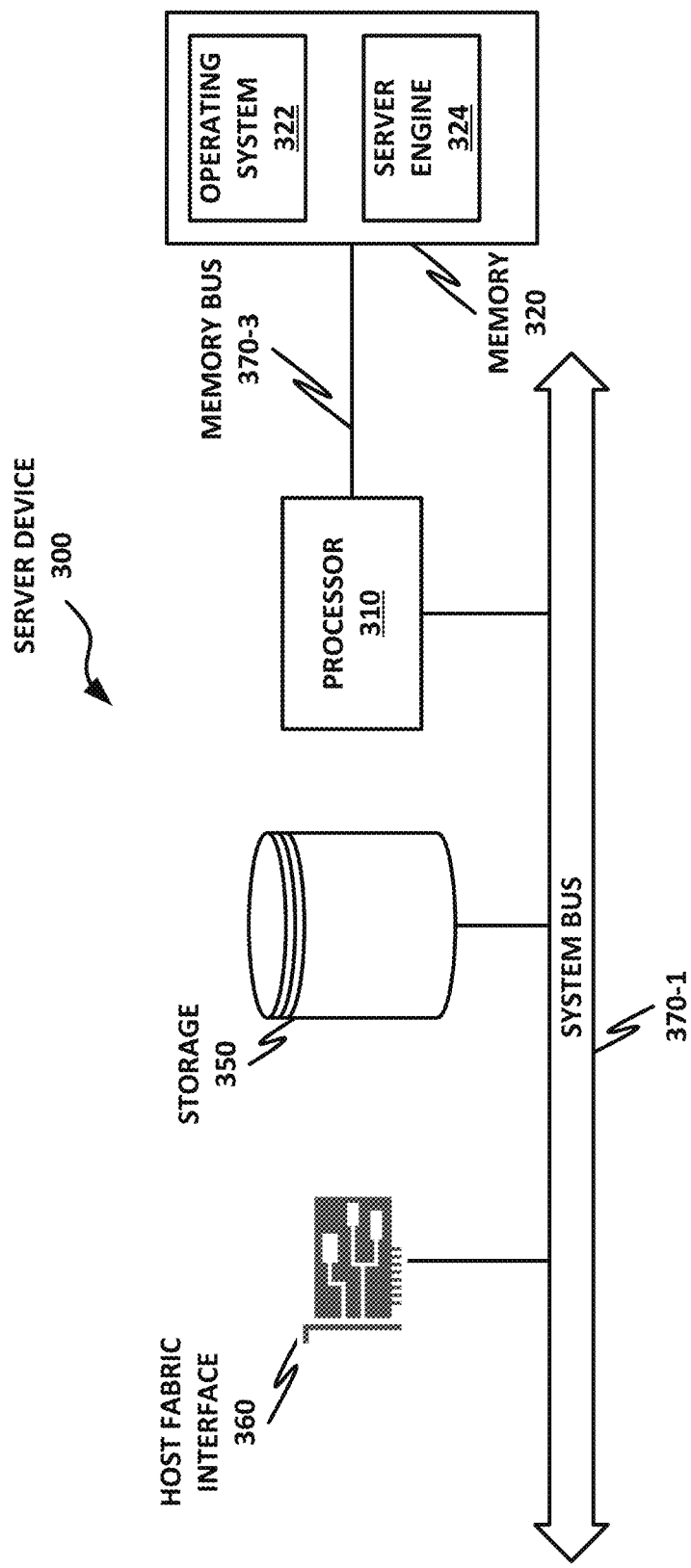
FIG. 3 is a high-level block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations may be divided along a client-server model, wherein client device 200 provides certain localized tasks, while server 300 provides certain other centralized tasks.

Note that server 300 of FIG. 3 illustrates in particular the classic "Von Neumann Architecture" aspects of server 300, with a focus on functional blocks. Other FIGURES herein (e.g., FIGS. 4a, 4b, and 5 below) may illustrate other aspects of a client or server device, with more focus on virtualization aspects. These illustrated embodiments are not intended to be mutually exclusive or to infer a necessary distinction. Rather, the various views and diagrams are intended to illustrate different perspectives and aspects of these devices.

In a particular example, server device 300 may be a memory server as illustrated herein.

Server 300 includes a processor 310 connected to a memory 320, having stored therein executable instructions for providing an operating system 322 and at least software portions of a memory server engine 324. Other components of server 300 include a storage 350, and host fabric interface 360. As described in FIG. 2, each logical block may be provided by one or more similar or dissimilar logic elements.

In an example, processor 310 is communicatively coupled to memory 320 via memory bus 370-3, which may be, for example, a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type. Memory 320 may include a persistent fast memory, such as 3DXP or similar.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of memory server engine 324.

Host fabric interface 360 may be provided to communicatively couple server 300 to a wired or wireless network, including a host fabric. A host fabric may include a switched interface for communicatively coupling nodes in a cloud or cloud-like environment. HFI 360 is used by way of example here, though any other suitable network interface (as discussed in connection with network interface 260) may be used.

Memory server engine 324 is an engine as described in FIG. 2 and, in one example, includes one or more logic elements operable to carry out computer-implemented methods as described in this specification. Software portions of memory server engine 324 may run as a daemon process.

Memory server engine 324 may include one or more nontransitory computer-readable mediums having stored thereon executable instructions operable to instruct a processor to provide memory server engine 324. At an appropriate time, such as upon booting server 300 or upon a command from operating system 322 or a user 120 or security administrator 150, processor 310 may retrieve a copy of memory server engine 324 (or software portions thereof) from storage 350 and load it into memory 320. Processor 310 may then iteratively execute the instructions of memory server engine 324 to provide the desired method.

Figure 4A:
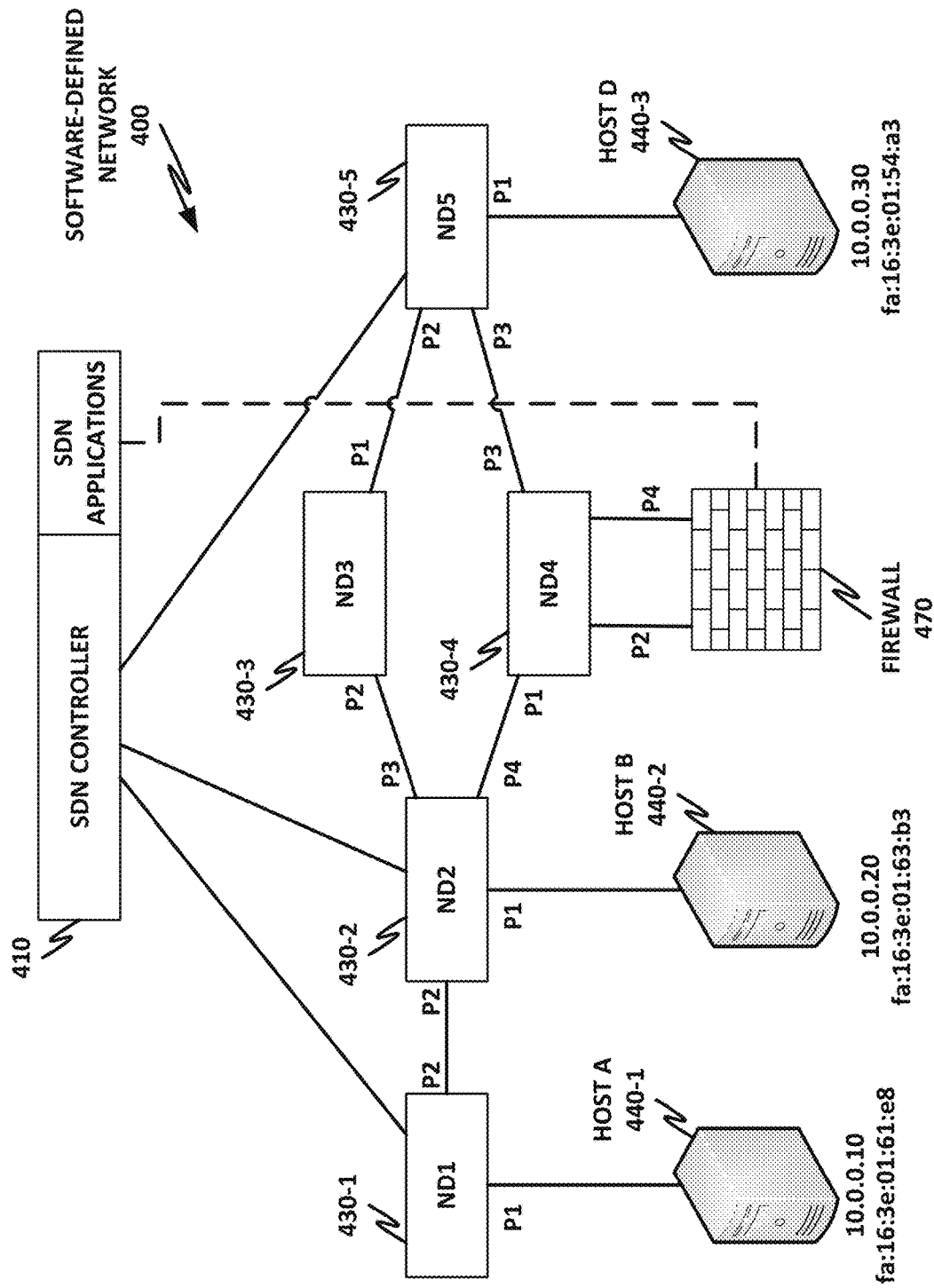
FIG. 4a is a block diagram of software-defined networking (SDN) according to one or more examples of the present specification.

FIG. 4a is a block diagram of a software-defined network 400. In software defined networking (SDN), a data plane is separated from a control plane to realize certain advantages. SDN is only one flavor of virtualization, shown here to illustrate one option for a network setup.

Figure 4B:
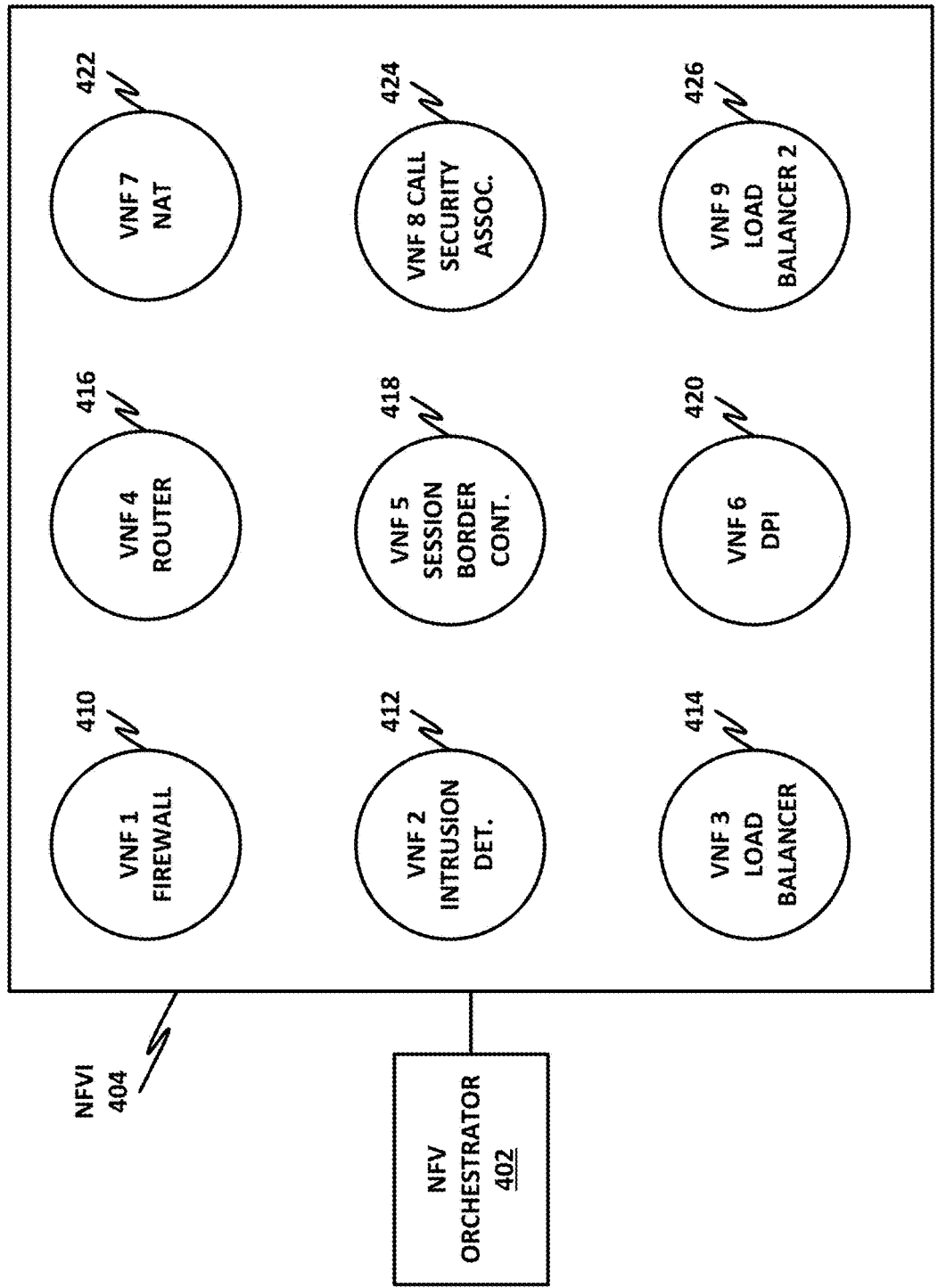
FIG. 4b is a block diagram of network function virtualization (NFV) according to one or more examples of the present specification.

Network function virtualization, illustrated in FIG. 4b, is a second nonlimiting flavor of network virtualization, often treated as an add-on or improvement to SDN, but sometimes treated as a separate entity. Network function virtualization (NFV) was originally envisioned as a method for providing reduced capital expenditure (Capex) and operating expenses (Opex) for telecommunication services, which relied heavily on fast, single-purpose service appliances. One important feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times where more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI). Often, the VNFs are in-line service functions that are separate from workload servers or other nodes (in many cases, workload-type functions were long since virtualized). These VNFs can be chained together into a service chain, which may be defined by a virtual subnetwork, and which may include a serial string of network services that provide behind-the-scenes work, such as security, logging, billing, and similar. In one example, an incoming packet passes through a chain of services in a service chain, with one or more of the services being provided by a VNF, whereas historically each of those functions may have been provided by bespoke hardware in a physical service appliance. Because NFVs can be spun up and spun down to meet demand, the allocation of hardware and other resources can be made more efficient. Processing resources can be allocated to meet the greatest demand, whereas with physical service appliances, any unused capacity on an appliance is simply wasted, and increasing capacity to meet demand required plugging in a physical (expensive) bespoke service appliance.

The illustrations of FIGS. 4a and 4b may be considered more functional, while in comparison the illustration of FIG. 1 may be more of a high-level logical layout of the network. It should be understood, however, that SDN 400 (FIG. 4a), NFVI 404 (FIG. 4b), and enterprise network 100 may be the same network, or may be separate networks.

In FIG. 4a, SDN 400 may include an SDN controller 410, a plurality of network devices 430, and a plurality of host devices 440. Some or all of SDN controller 410, network devices 430, and host devices 440 may be embodied within workload cluster 142 of FIG. 1, or may otherwise form a part of enterprise network 170.

SDN 400 is controlled by an SDN controller 410. SDN controller 410 is communicatively coupled to a plurality of network devices 430. Specifically, ND1 430-1, ND2 430-2, and ND5 430-5 are directly communicatively coupled to SDN controller 410. Network devices and ND3 430-3 and ND4 430-4 are not directly coupled to SDN controller 410, but rather coupled via the intermediate devices, such as ND2 430-2, and ND5 430-5.

Some network devices 430 also communicatively couple directly to host devices 440. Specifically, network device ND1 directly couples to host A 440-1, which has IP address 10.0.0.10, and MAC address FA:16:3:01:61:8. Network device ND2 430-2 directly couples to host B 440-2, which has IP address 10.0.0.20, and MAC address FA:16:3:01:63:B3. Network device ND5 430-5 directly couples to host D 440-3, which has IP address 10.0.0.30, and MAC address FA:16:3:01:54:83.

Network devices 430 may be configured to perform a variety of network functions, such as, by way of nonlimiting example, load-balancing, firewall, deep packet inspection (DPI), DNS, antivirus, or any other suitable network function. The particular arrangement of interconnections between network devices 430 and from network devices 430 to host devices 440 may be determined by the particular network configuration and needs. Thus, the specific configuration of FIG. 4a should be understood to be an illustrative example only.

Each network device 430 may have a plurality of ingress and or egress interfaces, such as physical Ethernet or fabric ports. In an example, each interface may have a label or new name, such as P1, P2, P3, P4, P5, and so on. Thus, certain aspects of the network layout can be determined by inspecting which devices are connected on which interface. For example, network device ND1 430-1 has an ingress interface for receiving instructions and communicating with SDN controller 410. ND1 430-1 also has an interface P1 communicatively coupled to host A 440-1. ND1 430-1 has interface P2 that is communicatively coupled to ND2 430-2. In the case of ND2 430-2, it also couples to ND1 430-1 on its own interface P2, and couples to host B 440-2 via interface P1. ND2 430-2 communicatively couples to intermediate devices ND3 430-3 and ND4 430-4 via interfaces P3 and P4 respectively. Additional interface definitions are visible throughout the figure.

A flow table may be defined for traffic as it flows from one interface to another. This flow table is used so that a network device, such as ND2 430-2 can determine, after receiving a packet, where to send it next.

For example, the following flow tables may be defined for ND1 430-1-ND4 430-4.

TABLE 1

| | | ND1 Flow Rule | | | |
|---|---|---|---|---|---|
| Ingress I/F | Source MAC | Destination Mac | Source IP | Dest. IP | Action |
| P1 | ANY | fa:16:3e:01:54:a3 | ANY | 10.0.0.30 | P2 |

TABLE 2

| | | ND2 Flow Rule | | | |
|---|---|---|---|---|---|
| Ingress I/F | Source MAC | Destination Mac | Source IP | Dest. IP | Action |
| P2 | ANY | fa:16:3e:01:54:a3 | ANY | 10.0.0.30 | P4 |

TABLE 3

| | | ND3 Flow Rule | | | |
|---|---|---|---|---|---|
| Ingress I/F | Source MAC | Destination Mac | Source IP | Dest. IP | Action |
| P1 | ANY | fa:16:3e:01:54:a3 | ANY | 10.0.0.30 | P3 |

TABLE 4

| | | ND4 Flow Rule | | | |
|---|---|---|---|---|---|
| Ingress I/F | Source MAC | Destination Mac | Source IP | Dest. IP | Action |
| P3 | ANY | fa:16:3e:01:54:a3 | ANY | 10.0.0.30 | P1 |

FIG. 4b is a block diagram of a network function virtualization (NFV) architecture according to one or more examples of the present specification. Like SDN, NFV is a subset of network virtualization. Thus, the network as illustrated in FIG. 4b may be defined instead of or in addition to the network of FIG. 4a. In other words, certain portions of the network may rely on SDN, while other portions (or the same portions) may rely on NFV.

In the example of FIG. 4b, an NFV orchestrator 402 manages a number of the VNFs running on in an NFVI 404. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus the need for NFV orchestrator 402.

Note that VNF orchestrator 402 itself is usually virtualized (rather than a special-purpose hardware appliance). NFV orchestrator 402 may be integrated within an existing SDN system, wherein an operations support system (OSS) manages the SDN. This may interact with cloud resource management systems (e.g., OpenStack) to provide NVF orchestration. There are many commercially-available, off-the-shelf, proprietary, and open source solutions for NFV orchestration and management (sometimes referred to as NFV MANO). In addition to NFV orchestrator 402, NFV MANO may also include functions such as virtualized infrastructure management (VIM) and a VNF manager.

An NFVI 404 may include the hardware, software, and other infrastructure to enable VNFs to run. This may include, for example, a rack or several racks of blade or slot servers (including, e.g., processors, memory, and storage), one or more datacenters, other hardware resources distributed across one or more geographic locations, hardware switches, or network interfaces. An NFVI 404 may also include the software architecture that enables hypervisors to run and be managed by NFV orchestrator 402. NFVI 402 may include NFVI points of presence (NFVI-PoPs), where VNFs are deployed by the operator.

Running on NFVI 404 are a number of virtual machines, each of which, in this example, is a VNF providing a virtual service appliance. These include, as nonlimiting and illustrative examples, VNF 1 410, which is a firewall, VNF 2 412, which is an intrusion detection system, VNF 3 414, which is a load balancer, VNF 4 416, which is a router, VNF 5 418, which is a session border controller, VNF 6 420, which is a deep packet inspection (DPI) service, VNF 7 422, which is a network address translation (NAT) module, VNF 8 424, which provides call security association, and VNF 9 426, which is a second load balancer spun up to meet increased demand.

Firewall 410 is a security appliance that monitors and controls the traffic (both incoming and outgoing), based on matching traffic to a list of "firewall rules." Firewall 410 may be a barrier between a relatively trusted (e.g., internal) network, and a relatively untrusted network (e.g., the Internet). Once traffic has passed inspection by firewall 410, it may be forwarded to other parts of the network.

Intrusion detection 412 monitors the network for malicious activity or policy violations. Incidents may be reported to security administrator 150, or collected and analyzed by a security information and event management (SIEM) system. In some cases, intrusion detection 412 may also include antivirus or antimalware scanners.

Load balancers 414 and 426 may farm traffic out to a group of substantially identical workload servers to distribute the work in a fair fashion. In one example, a load balancer provisions a number of traffic "buckets," and assigns each bucket to a workload server. Incoming traffic is assigned to a bucket based on a factor, such as a hash of the source IP address. Because the hashes are assumed to be fairly evenly distributed, each workload server receives a reasonable amount of traffic.

Router 416 forwards packets between networks or subnetworks. For example, router 416 may include one or more ingress interfaces, and a plurality of egress interfaces, with each egress interface being associated with a resource, subnetwork, virtual private network, or other division. When traffic comes in on an ingress interface, router 416 determines what destination it should go to, and routes the packet to the appropriate egress interface.

Session border controller 418 controls voice over IP (VoIP) signaling, as well as the media streams to set up, conduct, and terminate calls. In this context, "session" refers to a communication event (e.g., a "call"). "Border" refers to a demarcation between two different parts of a network (similar to a firewall).

DPI appliance 420 provides deep packet inspection, including examining not only the header, but also the content of a packet to search for potentially unwanted content (PUC), such as protocol non-compliance, malware, viruses, spam, or intrusions.

NAT module 422 provides network address translation services to remap one IP address space into another (e.g., mapping addresses within a private subnetwork onto the larger Internet).

Call security association 424 creates a security association for a call or other session (see session border controller 418 above). Maintaining this security association may be critical, as the call may be dropped if the security association is broken.

The illustration of FIG. 4 shows that a number of VNFs have been provisioned and exist within NFVI 404. This figure does not necessarily illustrate any relationship between the VNFs and the larger network.

Figure 5:
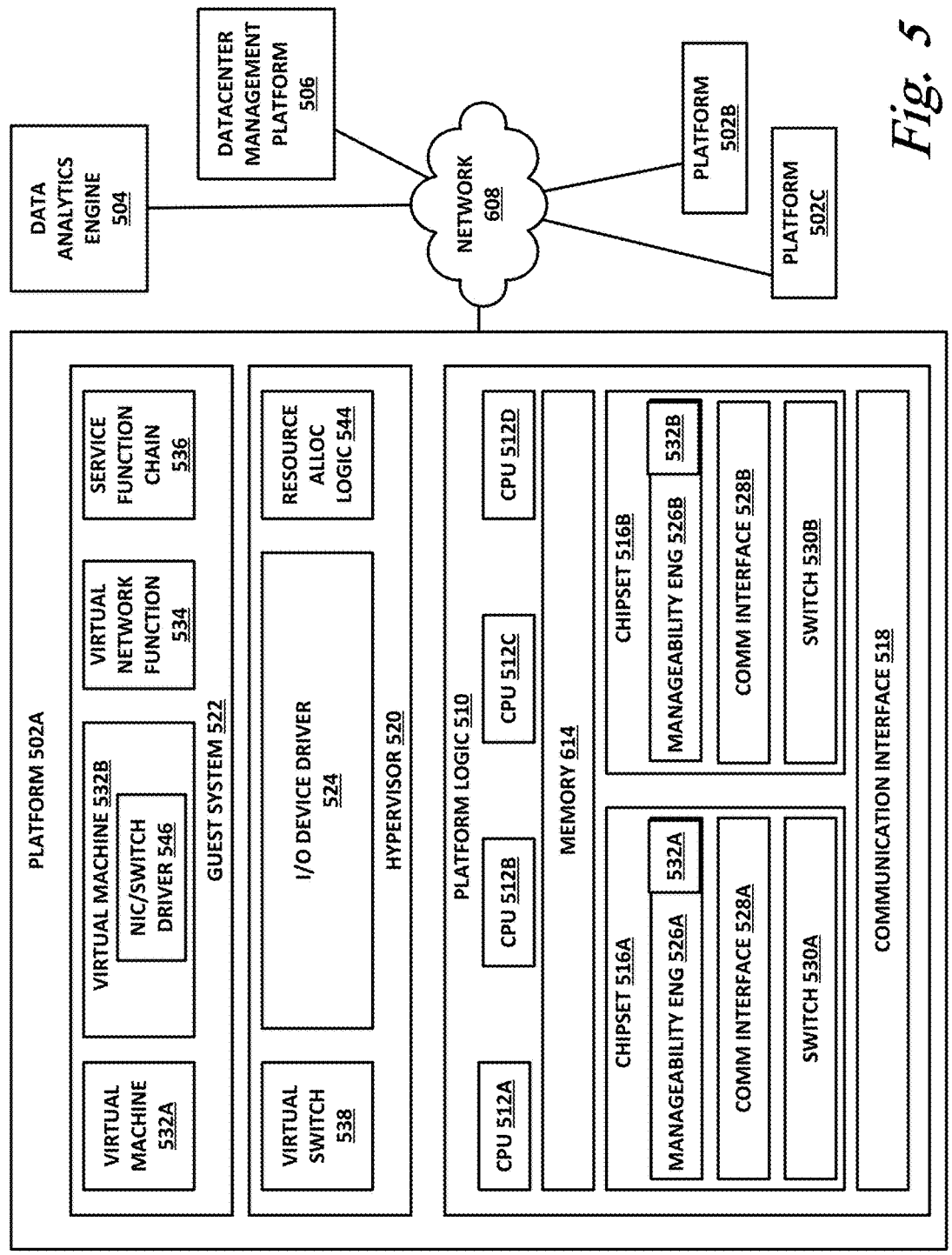
FIG. 5 is a block diagram of a platform architecture according to one or more examples of the present specification.

FIG. 5 illustrates a block diagram of components of a computing platform 500 according to one or more examples of the present specification. In the embodiment depicted, computer platform 500 includes a plurality of platforms 502 and system management platform 506 coupled together through network 508. In other embodiments, a computer system may include any suitable number (i.e., one or more) of platforms. In some embodiments (e.g., when a computer system only includes a single platform), all or a portion of the system management platform 506 may be included on a platform 502. A platform 502 may include platform logic 510 with one or more central processing units (CPUs) 512, memories 514 (which may include any number of different modules), chipsets 516, communication interfaces 518, and any other suitable hardware and/or software to execute a hypervisor 520 or other operating system capable of executing workloads associated with applications running on platform 502. In some embodiments, a platform 502 may function as a host platform for one or more guest systems 522 that invoke these applications. Platform 500 may represent any suitable computing environment, such as a high performance computing environment, a datacenter, a communications service provider infrastructure (e.g., one or more portions of an evolved packet core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated in a plurality of hardware resources (e.g., cores and uncores) are monitored and entities (e.g., system management platform 506, hypervisor 520, or other operating system) of computer platform 500 may assign hardware resources of platform logic 510 to perform workloads in accordance with the stress information. For example, system management platform 506, hypervisor 520 or other operating system, or CPUs 512 may determine one or more cores to schedule a workload onto, based on the stress information. In some embodiments, self-diagnostic capabilities may be combined with the stress monitoring to more accurately determine the health of the hardware resources. Such embodiments may allow optimization in deployments including network function virtualization (NFV), software defined networking (SDN), or mission critical applications. For example, the stress information may be consulted during the initial placement of virtual network functions (VNFs), or for migration from one platform to another in order to improve reliability and capacity utilization.

Each platform 502 may include platform logic 510. Platform logic 510 comprises, among other logic, enabling the functionality of platform 502, one or more CPUs 512, memory 514, one or more chipsets 516, and communication interface 518. Although three platforms are illustrated, computer platform 500 may include any suitable number of platforms. In various embodiments, a platform 502 may reside on a circuit board that is installed in a chassis, rack, or other suitable structure that comprises multiple platforms coupled together through network 508 (which may comprise, e.g., a rack or backplane switch).

CPUs 512 may each comprise any suitable number of processor cores and supporting logic (e.g., uncores). The cores may be coupled to each other, to memory 514, to at least one chipset 516, and/or to communication interface 518, through one or more controllers residing on CPU 612 and/or chipset 516. In particular embodiments, a CPU 612 is embodied within a socket that is permanently or removably coupled to platform 502. CPU 612 is described in further detail below in connection with FIG. 2. Although four CPUs are shown, a platform 502 may include any suitable number of CPUs.

Memory 514 may comprise any form of volatile or nonvolatile memory, including, without limitation, magnetic media (e.g., one or more tape drives), optical media, random access memory (RAM), read-only memory (ROM), flash memory, removable media, or any other suitable local or remote memory component or components. Memory 514 may be used for short, medium, and/or long-term storage by platform 502. Memory 514 may store any suitable data or information utilized by platform logic 510, including software embedded in a computer readable medium, and/or encoded logic incorporated in hardware or otherwise stored (e.g., firmware). Memory 514 may store data that is used by cores of CPUs 512. In some embodiments, memory 514 may also comprise storage for instructions that may be executed by the cores of CPUs 512 or other processing elements (e.g., logic resident on chipsets 516) to provide functionality associated with the manageability engine 526 or other components of platform logic 510. Additionally or alternatively, chipsets 516 may each comprise memory that may have any of the characteristics described herein with respect to memory 514. Memory 514 may also store the results and/or intermediate results of the various calculations and determinations performed by CPUs 512 or processing elements on chipsets 516. In various embodiments, memory 514 may comprise one or more modules of system memory coupled to the CPUs through memory controllers (which may be external to or integrated with CPUs 512). In various embodiments, one or more particular modules of memory 514 may be dedicated to a particular CPU 612 or other processing device or may be shared across multiple CPUs 512 or other processing devices.

In various embodiments, memory 514 may store stress information (such as accumulated stress values associated with hardware resources of platform logic 510 in nonvolatile memory, such that when power is lost, the accumulated stress values are maintained). In particular embodiments, a hardware resource may comprise nonvolatile memory (e.g., on the same die as the particular hardware resource) for storing the hardware resource's accumulated stress value.

A platform 502 may also include one or more chipsets 516 comprising any suitable logic to support the operation of the CPUs 512. In various embodiments, chipset 516 may reside on the same die or package as a CPU 612 or on one or more different dies or packages. Each chipset may support any suitable number of CPUs 512. A chipset 516 may also include one or more controllers to couple other components of platform logic 510 (e.g., communication interface 518 or memory 514) to one or more CPUs. Additionally or alternatively, the CPUs 512 may include integrated controllers. For example, communication interface 518 could be coupled directly to CPUs 512 via integrated IO controllers resident on each CPU.

In the embodiment depicted, each chipset 516 also includes a manageability engine 526. Manageability engine 526 may include any suitable logic to support the operation of chipset 516. In a particular embodiment, manageability engine 526 (which may also be referred to as an innovation engine) is capable of collecting real-time telemetry data from the chipset 516, the CPU(s) 512 and/or memory 514 managed by the chipset 516, other components of platform logic 510, and/or various connections between components of platform logic 510. In various embodiments, the telemetry data collected includes the stress information described herein.

In various embodiments, the manageability engine 526 operates as an out-of-band asynchronous compute agent which is capable of interfacing with the various elements of platform logic 510 to collect telemetry data with no or minimal disruption to running processes on CPUs 512. For example, manageability engine 526 may comprise a dedicated processing element (e.g., a processor, controller, or other logic) on chipset 516 which provides the functionality of manageability engine 526 (e.g., by executing software instructions), thus conserving processing cycles of CPUs 512 for operations associated with the workloads performed by the platform logic 510. Moreover, the dedicated logic for the manageability engine 526 may operate asynchronously with respect to the CPUs 512 and may gather at least some of the telemetry data without increasing the load on the CPUs.

The manageability engine 526 may process telemetry data it collects (specific examples of the processing of stress information will be provided herein). In various embodiments, manageability engine 526 reports the data it collects and/or the results of its processing to other elements in the computer system, such as one or more hypervisors 520 or other operating systems and/or system management software (which may run on any suitable logic such as system management platform 506). In some embodiments, the telemetry data is updated and reported periodically to one or more of these entities. In particular embodiments, a critical event such as a core that has accumulated an excessive amount of stress may be reported prior to the normal interval for reporting telemetry data (e.g., a notification may be sent immediately upon detection).

In various embodiments, a manageability engine 526 may include programmable code configurable to set which CPU(s) 512 a particular chipset 516 will manage and/or which telemetry data will be collected.

Chipsets 516 also each include a communication interface 528. Communication interface 528 may be used for the communication of signaling and/or data between chipset 516 and one or more IO devices, one or more networks 508, and/or one or more devices coupled to network 508 (e.g., system management platform 506). For example, communication interface 528 may be used to send and receive network traffic such as data packets. In a particular embodiment, communication interface 528 comprises one or more physical network interface controllers (NICs), also known as network interface cards or network adapters. A NIC may include electronic circuitry to communicate using any suitable physical layer and data link layer standard such as Ethernet (e.g., as defined by an IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 516 (e.g., manageability engine 526 or switch 530) and another device coupled to network 508. In some embodiments, network 508 may comprise a switch with bridging and/or routing functions that is external to the platform 502 and operable to couple various NICs distributed throughout the computer platform 500 (e.g., on different platforms) to each other. In various embodiments, a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interface 528 may allow communication of data (e.g., between the manageability engine 526 and the system management platform 506) associated with management and monitoring functions performed by manageability engine 526. In various embodiments, manageability engine 526 may utilize elements (e.g., one or more NICs) of communication interface 528 to report the telemetry data (e.g., to system management platform 506) in order to reserve usage of NICs of communication interface 518 for operations associated with workloads performed by platform logic 510. In some embodiments, communication interface 528 may also allow IO devices integrated with or external to the platform (e.g., disk drives, other NICs, etc.) to communicate with the CPU cores.

Switch 530 may couple to various ports (e.g., provided by NICs) of communication interface 528 and may switch data between these ports and various components of chipset 516 (e.g., one or more peripheral component interconnect express (PCIe) lanes coupled to CPUs 512). Switch 530 may be a physical or virtual (i.e., software) switch.

Platform logic 510 may include an additional communication interface 518. Similar to communication interface 528, communication interface 518 may be used for the communication of signaling and/or data between platform logic 510 and one or more networks 508 and one or more devices coupled to the network 508. For example, communication interface 518 may be used to send and receive network traffic such as data packets. In a particular embodiment, communication interface 518 comprises one or more physical NICs. These NICs may enable communication between any suitable element of platform logic 510 (e.g., CPUs 512 or memory 514) and another device coupled to network 508 (e.g., elements of other platforms or remote computing devices coupled to network 508 through one or more networks). In particular embodiments, communication interface 518 may allow devices external to the platform (e.g., disk drives, other NICs, etc.) to communicate with the CPU cores. In various embodiments, NICs of communication interface 518 may be coupled to the CPUs through IO controllers (which may be external to or integrated with CPUs 512).

Platform logic 510 may receive and perform any suitable types of workloads. A workload may include any request to utilize one or more resources of platform logic 510, such as one or more cores or associated logic. For example, a workload may comprise a request to instantiate a software component, such as an IO device driver 524 or guest system 522; a request to process a network packet received from a virtual machine 532 or device external to platform 502 (such as a network node coupled to network 508); a request to execute a process or thread associated with a guest system 522, an application running on platform 502, a hypervisor 520 or other operating system running on platform 502; or other suitable processing request.

In various embodiments, platform 502 may execute any number of guest systems 522. A guest system may comprise a single virtual machine (e.g., virtual machine 532*a* or 532*b*) or multiple virtual machines operating together (e.g., a virtual network function (VNF) 534 or a service function chain (SFC) 536). As depicted, various embodiments may include a variety of types of guest systems 522 present on the same platform 502.

A virtual machine 532 may emulate a computer system with its own dedicated hardware. A virtual machine 532 may run a guest operating system on top of the hypervisor 520. The components of platform logic 510 (e.g., CPUs 512, memory 514, chipset 516, and communication interface 518) may be virtualized such that it appears to the guest operating system that the virtual machine 532 has its own dedicated components.

A virtual machine 532 may include a virtualized NIC (vNIC), which is used by the virtual machine as its network interface. A vNIC may be assigned a media access control (MAC) address or other identifier, thus allowing multiple virtual machines 532 to be individually addressable in a network.

In some embodiments, a virtual machine 532*b* may be paravirtualized. For example, the virtual machine 532*b* may include augmented drivers (e.g., drivers that provide higher performance or have higher bandwidth interfaces to underlying resources or capabilities provided by the hypervisor 520). For example, an augmented driver may have a faster interface to underlying virtual switch 538 for higher network performance as compared to default drivers.

VNF 534 may comprise a software implementation of a functional building block with defined interfaces and behavior that can be deployed in a virtualized infrastructure. In particular embodiments, a VNF 534 may include one or more virtual machines 532 that collectively provide specific functionalities (e.g., wide area network (WAN) optimization, virtual private network (VPN) termination, firewall operations, load-balancing operations, security functions, etc.). A VNF 534 running on platform logic 510 may provide the same functionality as traditional network components implemented through dedicated hardware. For example, a VNF 534 may include components to perform any suitable NFV workloads, such as virtualized evolved packet core (vEPC) components, mobility management entities, 3rd Generation Partnership Project (3GPP) control and data plane components, etc.

SFC 536 is group of VNFs 534 organized as a chain to perform a series of operations, such as network packet processing operations. Service function chaining may provide the ability to define an ordered list of network services (e.g. firewalls, load balancers) that are stitched together in the network to create a service chain.

A hypervisor 520 (also known as a virtual machine monitor) may comprise logic to create and run guest systems 522. The hypervisor 520 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 510. Services of hypervisor 520 may be provided by virtualizing in software or through hardware assisted resources that require minimal software intervention, or both. Multiple instances of a variety of guest operating systems may be managed by the hypervisor 520. Each platform 502 may have a separate instantiation of a hypervisor 520.

Hypervisor 520 may be a native or bare-metal hypervisor that runs directly on platform logic 510 to control the platform logic and manage the guest operating systems. Alternatively, hypervisor 520 may be a hosted hypervisor that runs on a host operating system and abstracts the guest operating systems from the host operating system. Various embodiments may include one or more non-virtualized platforms 502, in which case any suitable characteristics or functions of hypervisor 520 described herein may apply to an operating system of the non-virtualized platform.

Hypervisor 520 may include a virtual switch 538 that may provide virtual switching and/or routing functions to virtual machines of guest systems 522. The virtual switch 538 may comprise a logical switching fabric that couples the vNICs of the virtual machines 532 to each other, thus creating a virtual network through which virtual machines may communicate with each other. Virtual switch 538 may also be coupled to one or more networks (e.g., network 508) via physical NICs of communication interface 518 so as to allow communication between virtual machines 532 and one or more network nodes external to platform 502 (e.g., a virtual machine running on a different platform 502 or a node that is coupled to platform 502 through the Internet or other network). Virtual switch 538 may comprise a software element that is executed using components of platform logic 510. In various embodiments, hypervisor 520 may be in communication with any suitable entity (e.g., a SDN controller) which may cause hypervisor 520 to reconfigure the parameters of virtual switch 538 in response to changing conditions in platform 502 (e.g., the addition or deletion of virtual machines 532 or identification of optimizations that may be made to enhance performance of the platform).

Hypervisor 520 may also include resource allocation logic 544 which may include logic for determining allocation of platform resources based on the telemetry data (which may include stress information). Resource allocation logic 544 may also include logic for communicating with various components of platform logic 510 entities of platform 502 to implement such optimization, such as components of platform logic 502. For example, resource allocation logic 544 may direct which hardware resources of platform logic 510 will be used to perform workloads based on stress information.

Any suitable logic may make one or more of these optimization decisions. For example, system management platform 506; resource allocation logic 544 of hypervisor 520 or other operating system; or other logic of platform 502 or computer platform 500 may be capable of making such decisions (either alone or in combination with other elements of the platform 502). In a particular embodiment, system management platform 506 may communicate (using in-band or out-of-band communication) with the hypervisor 520 to specify the optimizations that should be used in order to meet policies stored at the system management platform.

In various embodiments, the system management platform 506 may receive telemetry data from and manage workload placement across multiple platforms 502. The system management platform 506 may communicate with hypervisors 520 (e.g., in an out-of-band manner) or other operating systems of the various platforms 502 to implement workload placements directed by the system management platform.

The elements of platform logic 510 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

Elements of the computer platform 500 may be coupled together in any suitable manner such as through one or more networks 508. A network 508 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium. In various embodiments, guest systems 522 may communicate with nodes that are external to the computer platform 500 through network 508.

Figure 6:
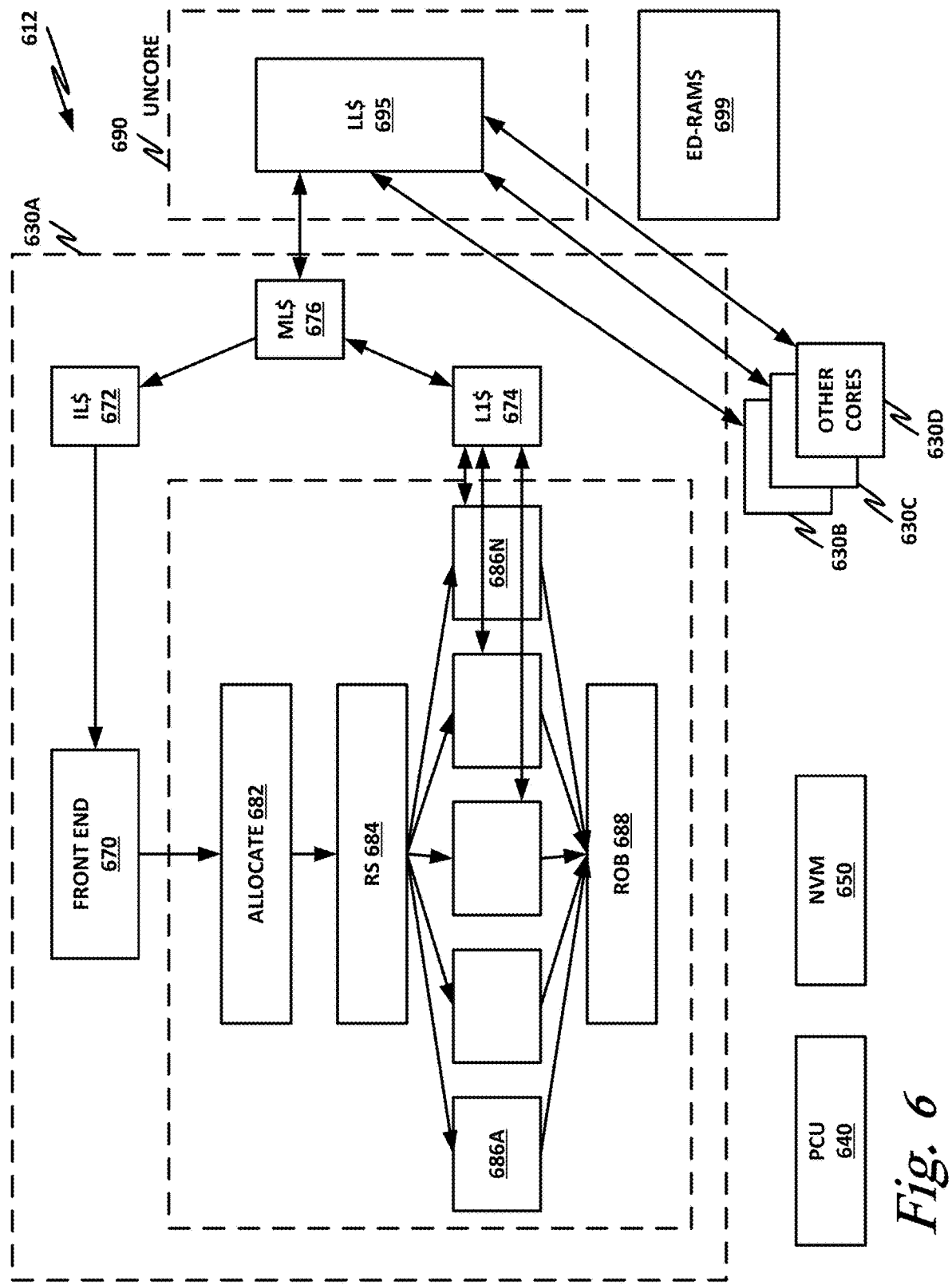
FIG. 6 is a block diagram of a processor according to one or more examples of the present specification.

FIG. 6 illustrates a block diagram of a central processing unit (CPU) 612 in accordance with certain embodiments. Although CPU 612 depicts a particular configuration, the cores and other components of CPU 612 may be arranged in any suitable manner. CPU 612 may comprise any processor or processing device, such as a microprocessor, an embedded processor, a digital signal processor (DSP), a network processor, an application processor, a coprocessor, a system on a chip (SOC), or other device to execute code. CPU 612, in the depicted embodiment, includes four processing elements (cores 630 in the depicted embodiment), which may include asymmetric processing elements or symmetric processing elements. However, CPU 612 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical CPU 612 may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 630A includes an out-of-order processor that has a front end unit 670 used to fetch incoming instructions, perform various processing (e.g., caching, decoding, branch predicting, etc.) and passing instructions/operations along to an out-of-order (OOO) engine 680. OOO engine 680 performs further processing on decoded instructions.

A front end 670 may include a decode module coupled to fetch logic to decode fetched elements. Fetch logic, in one embodiment, includes individual sequencers associated with thread slots of cores 630. Usually a core 630 is associated with a first ISA, which defines/specifies instructions executable on core 630. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. For example, decoders may, in one embodiment, include logic designed or adapted to recognize specific instructions, such as transactional instructions. As a result of the recognition by the decoders, the architecture of core 630 takes specific, predefined actions to perform tasks associated with the appropriate instruction. It is important to note that any of the tasks, blocks, operations, and methods described herein may be performed in response to a single or multiple instructions; some of which may be new or old instructions. Decoders of cores 630, in one embodiment, recognize the same ISA (or a subset thereof). Alternatively, in a heterogeneous core environment, a decoder of one or more cores (e.g., core 630B) may recognize a second ISA (either a subset of the first ISA or a distinct ISA).

In the embodiment depicted, out-of-order engine 680 includes an allocate unit 682 to receive decoded instructions, which may be in the form of one or more micro-instructions or uops, from front end unit 670, and allocate them to appropriate resources such as registers and so forth. Next, the instructions are provided to a reservation station 684, which reserves resources and schedules them for execution on one of a plurality of execution units 686A-686N. Various types of execution units may be present, including, for example, arithmetic logic units (ALUs), load and store units, vector processing units (VPUs), floating point execution units, among others. Results from these different execution units are provided to a reorder buffer (ROB) 688, which take unordered results and return them to correct program order.

In the embodiment depicted, both front end unit 670 and out-of-order engine 680 are coupled to different levels of a memory hierarchy. Specifically shown is an instruction level cache 672, that in turn couples to a mid-level cache 676, that in turn couples to a last level cache 695. In one embodiment, last level cache 695 is implemented in an on-chip (sometimes referred to as uncore) unit 690. Uncore 690 may communicate with system memory 699, which, in the illustrated embodiment, is implemented via embedded DRAM (eDRAM). The various execution units 686 within out-of-order engine 680 are in communication with a first level cache 674 that also is in communication with mid-level cache 676. Additional cores 630B-630D may couple to last level cache 695 as well.

In various embodiments, uncore 690 (sometimes referred to as a system agent) may include any suitable logic that is not a part of core 630. For example, uncore 690 may include one or more of a last level cache, a cache controller, an on-die memory controller coupled to a system memory, a processor interconnect controller (e.g., a Quick Path Interconnect or similar controller), an on-die IO controller, or other suitable on-die logic.

In particular embodiments, uncore 690 may be in a voltage domain and/or a frequency domain that is separate from voltage domains and/or frequency domains of the cores. That is, uncore 690 may be powered by a supply voltage that is different from the supply voltages used to power the cores and/or may operate at a frequency that is different from the operating frequencies of the cores.

CPU 612 may also include a power control unit (PCU) 640. In various embodiments, PCU 640 may control the supply voltages and the operating frequencies applied to each of the cores (on a per-core basis) and to the uncore. PCU 640 may also instruct a core or uncore to enter an idle state (where no voltage and clock are supplied) when not performing a workload.

In various embodiments, PCU 640 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 640 may detect stress characteristics at any suitable interval.

In various embodiments, PCU 640 may comprise a microcontroller that executes embedded firmware to perform various operations associated with stress monitoring described herein. In one embodiment, PCU 640 performs some or all of the PCU functions described herein using hardware without executing software instructions. For example, PCU 640 may include fixed and/or programmable logic to perform the functions of the PCU.

In various embodiments, PCU 640 is a component that is discrete from the cores 630. In particular embodiments, PCU 640 runs at a clock frequency that is different from the clock frequencies used by cores 630. In some embodiments where PCU is a microcontroller, PCU 640 executes instructions according to an ISA that is different from an ISA used by cores 630.

In various embodiments, CPU 612 may also include a nonvolatile memory 650 to store stress information (such as stress characteristics, incremental stress values, accumulated stress values, stress accumulation rates, or other stress information) associated with cores 630 or uncore 690, such that when power is lost, the stress information is maintained.

Figure 7:
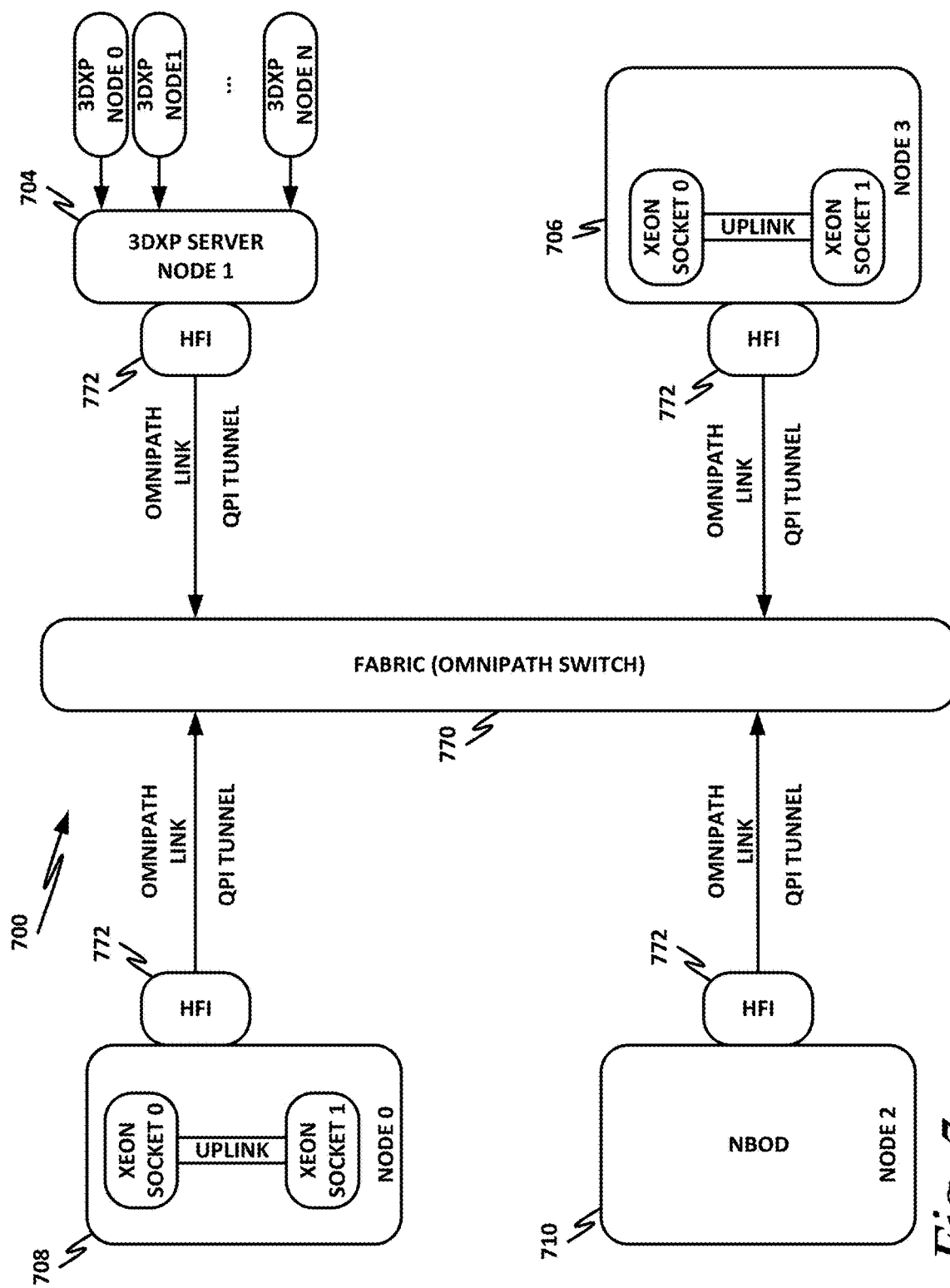
FIG. 7 is a block diagram of the datacenter as a computer according to one or more examples of the present specification.

FIG. 7 is a block diagram of a datacenter 700 as the computer according to one or more examples of the present specification.

Datacenter 700 may be configured to provide SLAs for certain resources. For example, datacenter 700 includes a node 0 708, which provides two sockets of Intel® Xeon® processors connected by an uplink. Node 1 704 is a memory server providing 3D Crosspoint (3DXP) persistent memory, with N 3DXP nodes. Node 2 710 is a storage server (a "networked bunch of disks" (NBOD)). Node 3 706 is a second server providing two sockets of Intel® Xeon® processors connected by an uplink. Each node includes a host fabric interface (HFI) 772, which is configured to communicatively couple the node to a fabric 770, which may include an Intel® Omnipath fabric, which may also (or instead) support Intel® Quick Path Interconnect (QPI). Note that Intel® Omnipath with corresponding HFIs is used as a nonlimiting example herein, but other interconnects may also be used. For example, PCIe, Ethernet, and other interconnects are compatible with the SLA architecture and method, in which case appropriate interfaces may be used, as discussed in connection with FIG. 2.

To provide a holistic SLA between the different requestors and providers in the system, a common semantic may be defined. The different messages and actions are based on this common conceptual baseline. Similarly, the software stack (e.g., applications, libraries, or operating systems) may also be configured to understand and follow the same semantic to access exposed and scaled-out SLA services.

In an example, a scaleout architecture comprises:
 a. A number of shared resources ($R_0 \ldots R_m$).
 b. Exposed node interfaces ($R_{N0} \ldots R_{Nn}$) (e.g., HFIs 772).
 c. A link (e.g., a fabric 770) interconnects the resources and node interface, described by a set of shared resources ($LR_0 \ldots LR_0$).

The scaleout architecture is accessible to a set of applications ($A_0 \ldots A_p$) running on a set of nodes ($AN_0 \ldots AN_q$) (e.g., software such as an application 224 running on node 708). Note that as used herein, an "application" may include any suitable software entity, such as an operating system, a library, a user space application, a daemon process, or a driver by way of nonlimiting example.

According to the semantic defined herein, a resource may have a type, a list of QoS metrics, an implementation and exposed mechanism to establish the SLA, and an implementation mechanism to detect contention and to throttle nodes or applications in the system.

By way of nonlimiting example, the resource type may include the following:
 a. Pooled resources (e.g., pooled memory on a memory server, pooled storage, or some other pooled resource).
 b. Fabric and network resources.
 c. Node resources exposed as a shared resource (e.g., node memory that is exposed as shared memory).
 d. Software exposed as a shared resource.
 e. Accelerators exposed as a shared resource.

The QoS metrics may be an array of name-value pairs or other pairs of the form {<ID,Unit>}. For example, the id "BW" (bandwidth) may have the unit "GB/S" (gigabits per second).

Fabric 770 provides a mechanism to send specific messages between nodes (e.g., tunneling messages in the QPI four-layer protocol) for SLA and throttling. HFI 772 exposes and provides mechanisms to applications to send SLA requests to remote shared resources, accessed via other node interfaces.

When an HFI 772 receives an SLA request, it may proxy the request to its local controller that controls the shared resource targeted by the request. For example, if the local resource is a storage pool, HFI 772 may forward receive an SLA request that is targeted for a certain flow. A "flow" in this context means any identified data unit or stream that is to receive a requested SLA. A flow may be associated with a user account, a tenant, a software package, a particular node, a specific device, or any other source. Flows may be identified by or associated with an identified tunnel, subnetworks or virtual subnetwork, virtual IP addresses (VIPs), an endpoint identifier (EID), a packet header field, or any other mechanism suitable for identifying a flow.

Figure 8:
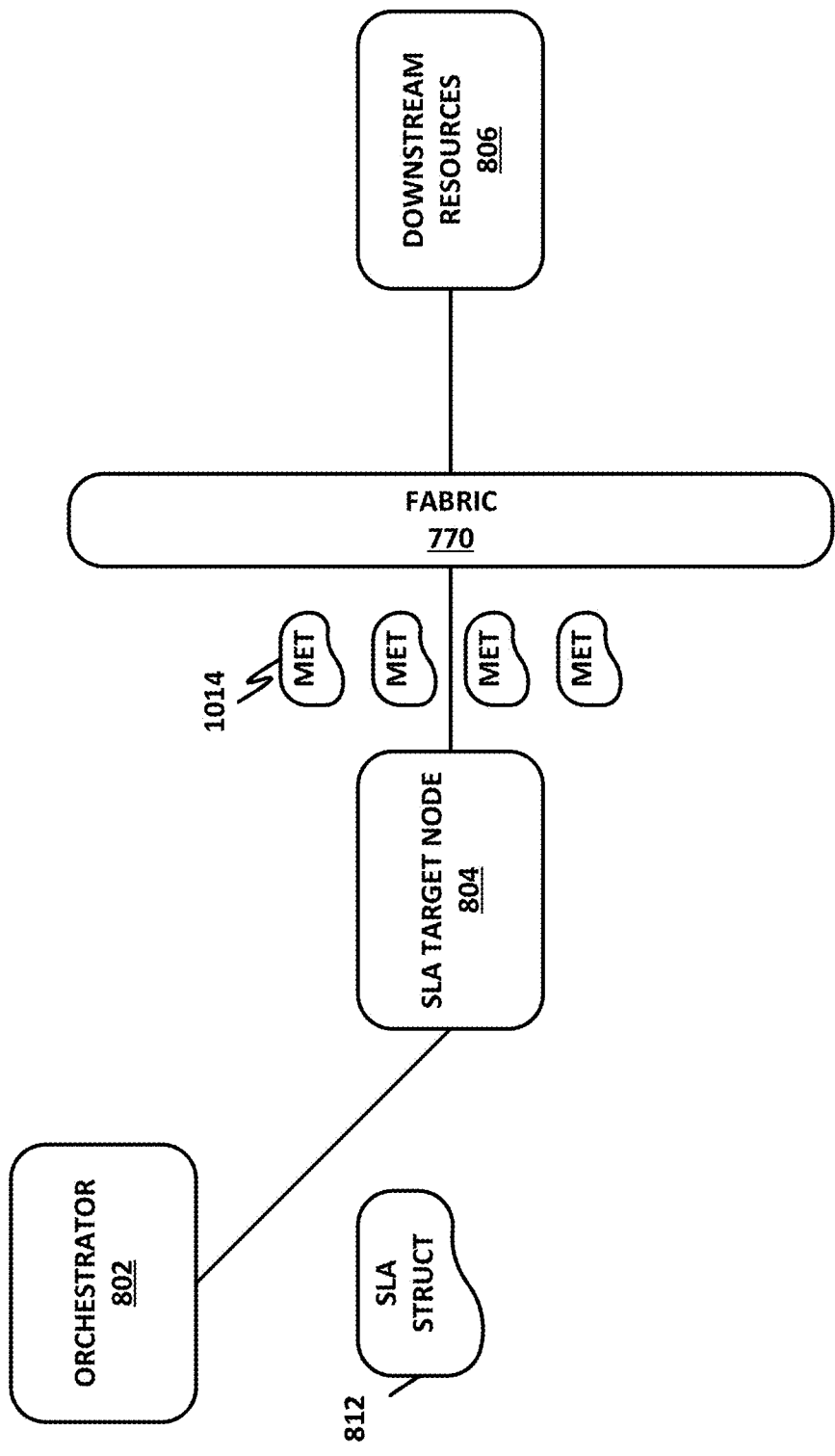
FIG. 8 is a block diagram illustrating propagation of SLAs according to one or more examples of the present specification.

FIG. 8 illustrates a block diagram of a datacenter according to one or more examples of the present specification. In the example of FIG. 8, an orchestrator 802 has global visibility of the datacenter and of the resources, nodes, and other units that make up the datacenter. In this case, SLA target node 804 may be guaranteed a particular SLA or other QoS metric. For example, SLA target node 804 may be allocated to a customer or end user who is to have a guaranteed end-to-end storage bandwidth of 2 GB/s.

To realize this guaranteed bandwidth, a holistic SLA may need to be propagated to downstream devices 806. Orchestrator 802 has a global view of the data structure, and thus is in a position to construct an end-to-end SLA policy, accounting for the intermediate elements that may affect the SLA. Orchestrator 802 may also have administrative privileges to enforce SLAs across the datacenter, and may have access to data such as customer agreements or user requirements. Note that orchestrator 802 in this context is intended to broadly encompass any orchestrator, controller, hypervisor, virtual machine manager, or other control entity that has the visibility and access to carry out the orchestrator function.

To provide the holistic or end-to-end SLA, orchestrator 802 may construct an "SLA structure" 812, which is a data structure that includes the information necessary to enforce the SLA. SLA data structure 812 may include, for example, an identification of the flow that is to receive the SLA, and identifiers for one or more devices or resources that affect the SLA, along with the semantic name-value pairs (as described above) that provide the QoS metric or metrics for each resource.

For example, the SLA may specify that a particular tenant is to receive a minimum of 32 gigabytes of 3DXP persistent memory at a minimum data rate of 2 gigabits per second. From the customer's perspective, the important matter is that this SLA is specified and provided. The customer need not be concerned about where the memory resides, or how the datacenter is set up.

Orchestrator 802 has visibility into this SLA, as well as a global view of the datacenter and the QoS metrics that need to be enforced to provide this SLA.

For example, referring back to FIG. 7, the tenant's software may be hosted on node 0 708, with Xeon® socket 0 providing a four-core processor that has been allocated to this tenant. Thus, one QoS metric may be the dedication of one Xeon® processor on node 0 the tenant: {<PROC, XEON_CPU>}, with the value "1" assigned, meaning that for the QoS metric "PROC" (processing allocation), with the metric of XEON_CPU (number of Xeon® CPUs allocated to the task), one CPU is assigned. A second QoS metric may be that the HFI 772 of node 0 708 must provide a certain dedicated bandwidth to 3DXP memory operations. These operations may need to receive queuing priority over certain other types of operations. Thus, the metric may identify a flow (e.g., a particular QPI tunnel) that contains 3DXP memory operations, and may require that a minimum data bandwidth of 2 Gb/s is allocated to that flow: {<FABRIC_BW, Gb/s>}, with the value "2" assigned (e.g., fabric bandwidth is measured in Gb/s, and the assigned value is 2).

Other QoS metrics may include, by way of nonlimiting example, a minimum bandwidth on fabric 770, a minimum allocation of 3DXP nodes on 3DXP server 704, and a minimum allocation of data bandwidth on HFI 772 of node 1 704. All of these QoS metrics work together to provide the desired SLA.

After constructing an SLA data structure 812 to enforce the end-to-end SLA, orchestrator 802 sends SLA data structure 812 to SLA target node 804. SLA target node 804 is the node that is to receive the benefit of the SLA (i.e., in this example, node 0 708). SLA target node 804 may have an SLA input logic structure, including appropriate circuitry and optionally software or firmware, for receiving from orchestrator 802 SLA data structure 812. SLA target node 804 may then parse SLA data structure 812 to separate out the individual QoS metrics for various downstream resources 806. After parsing out the individual QoS metrics, SLA target node 804 may operate a QoS metric output logic structure, including appropriate circuitry and optionally software or firmware, to propagate the individual QoS metrics out to the appropriate resources. In other words, SLA target node 804 may provide an HFI metric to its own HFI, and may propagate out to the fabric the appropriate fabric metric, and out to node 3 704 the metrics that are to be enforced on these nodes.

Note that in the foregoing example, the "SLA structure" is spoken of as being distinct from "QoS metrics." This is not to imply any necessary strict definition of "SLA" versus "QoS." Rather, "SLA" is used throughout this specification to speak of the "higher level" architecture that specifies an overall end-to-end result to be achieved, while "QoS metrics" refer to the specifications or allocations that individual devices are resources are instructed to provide in order to achieve the desired SLA. Thus, these terms should be understood to broadly encompass any such compatible structure.

Support for this architecture may be realized in more than one part of the datacenter.

In an example, the fabric protocol may be extended to provide a new species of flows (e.g., QPI layer 4 flows) that convey SLA requests and responses, including propagation of QoS metrics. These flows may be used by nodes or applications to establish and end-to-end SLA, with the HFI providing access to the shared resource.

Figure 11:
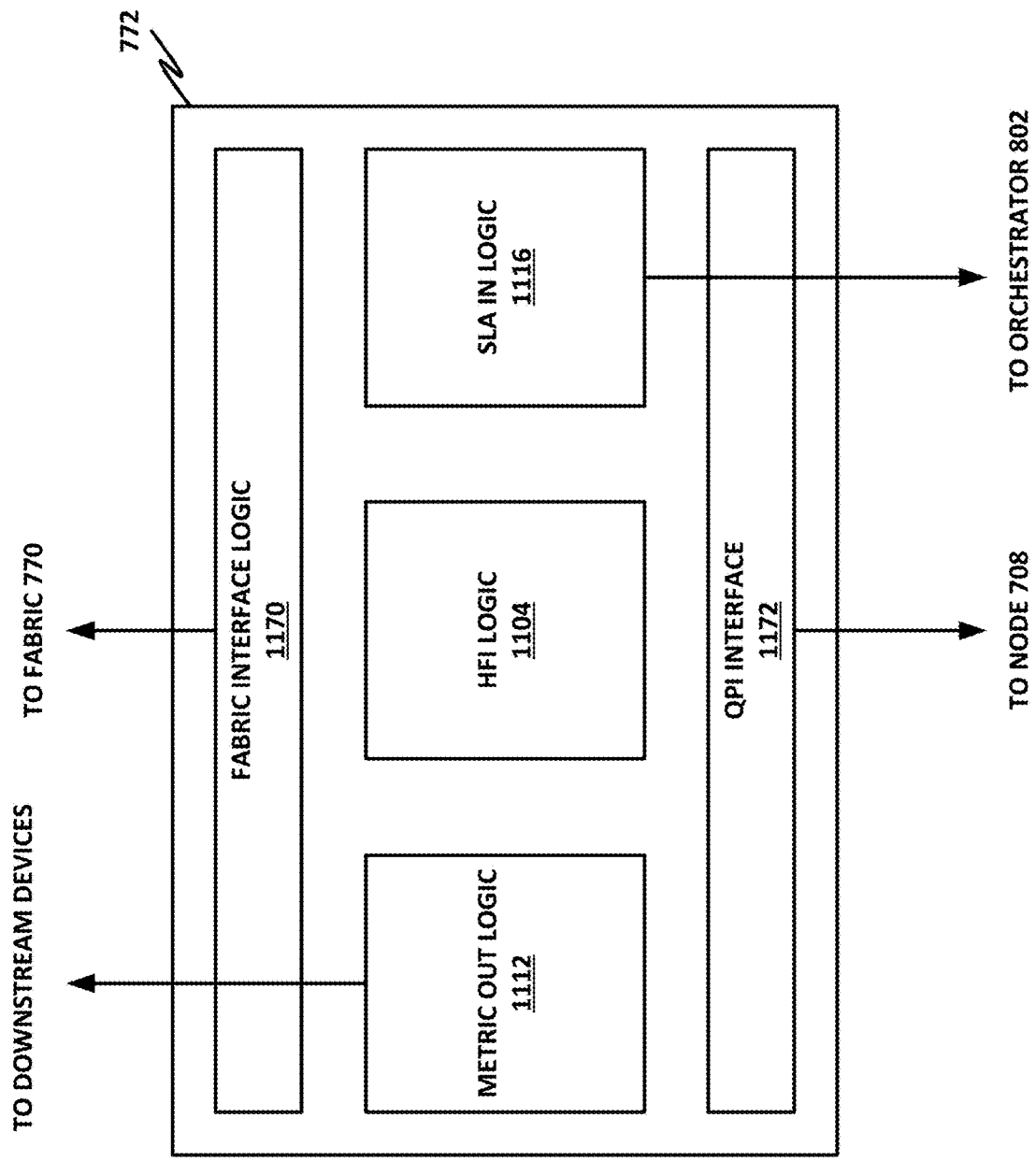
FIG. 11 is a block diagram of a host fabric interconnect (HFI) according to one or more examples of the present specification.

The HFI may be extended to provide mechanisms for application or node components to generate SLA messages to remote shared resources, as illustrated in more detail in FIG. 11. Conversely, the HFI may also handle incoming requests to establish a QoS metric for a resource that the HFI provides access to.

The fabric itself may also be extended to provide a centralized or distributed directory where applications or nodes can register and discover which shared resources connected through the fabric implement SLA semantics, and which QoS metrics are used to represent the SLAs.

Note that while the embodiments illustrated herein discuss a fabric such as Omnipath, the teachings of this specification are also compatible with other types of networking technologies, including, for example, Ethernet as illustrated in FIGS. 12-15.

Figure 9:
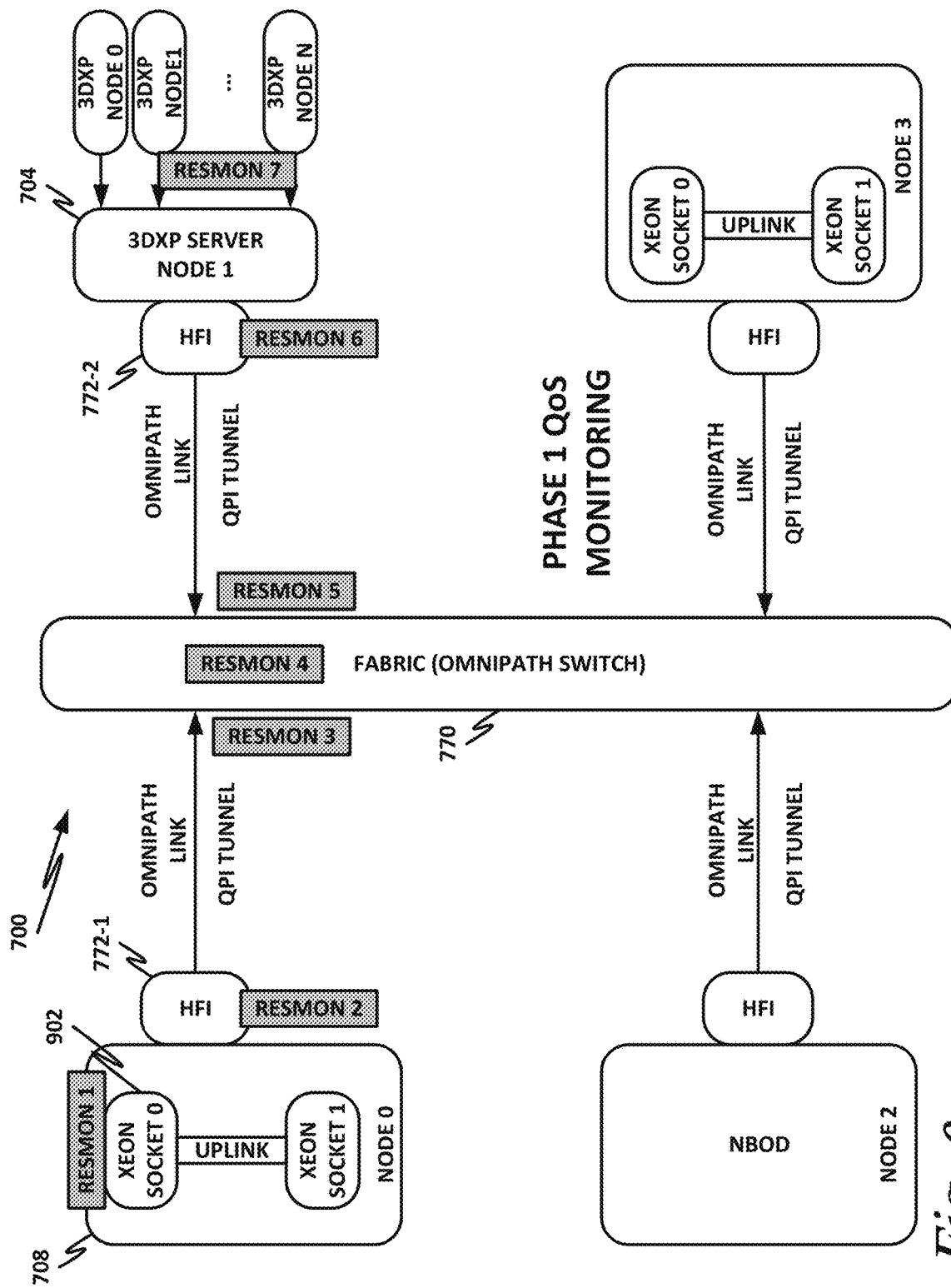
FIGS. 9 and 10 illustrate an example of resource monitoring and QoS metric propagation according to one or more examples of the present specification.

FIG. 9 is a block diagram illustration of a datacenter illustrating QoS monitoring according to one or more examples of the present specification.

As before, node 0 708 hosts an application that may be a target for an SLA. Node 0 708 is communicatively coupled to node 1 704, a 3DXP server, via fabric 770.

As discussed above, several QoS metrics factor into providing a holistic, end-to-end SLA for the application. Providing the SLA may be described as a two-phase process. In the first phase, as shown in FIG. 9, resource monitors are applied to the various resources that may factor into a future SLA. For example, in this case, processor 902, HFI 772-1, an ingress interface on fabric 770, internal resources of fabric 770, an egress interface on fabric 770, HFI 772-2, and allocation of 3DXP nodes are all resources that are a factor in the desired SLA of providing a particular memory bandwidth.

Thus, seven different resource monitors may be deployed to monitor resource usage and determine whether current datacenter requirements are being met. Note that at this phase, a specific end-to-end SLA may not yet be established. Rather, the network may be monitored to ensure that existing requirements are met. In an embodiment, Intel® Resource Director Technology™ (RDT) may be a valuable resource in measuring and exposing QoS and performance metrics for various resources.

In this case, resource monitor 1 may monitor processor 902 and determine whether the allocation of one multicore processor is sufficient to meet requirements. Resource monitor 2 monitors HFI 772-1, and helps to determine whether the data bandwidth allocated on HFI 772-1 is sufficient to meet requirements. Resource monitor 3 monitors an ingress interface on fabric 770. Resource monitor 4 monitors allocation of internal resources (e.g., processing bandwidth, priority queuing) on fabric 770. Resource monitor 5 monitors an egress interface on fabric 770. Resource monitor 6 monitors allocation of resources on HFI 772-2 of node 1 704. Resource monitor 7 monitors allocation of 3DXP memory nodes on node 1 704. In one example, HFI 772-1 serves as the agent for propagating the resource monitors and collecting inputs, similar to the propagation of QoS metrics described in FIG. 8. In that case, orchestrator 802 may send to HFI 772-1 a resource monitoring data structure including resource monitors for the target resources. HFI 772-1 may then propagate those resource monitors out to the resources. In some embodiments, resources may report directly to orchestrator 802, while in other embodiments, HFI 772-1 may collect and aggregate resource usage reports and provide them back to orchestrator 802.

By monitoring the resources with resource monitors, orchestrator 802 identifies which resources may be serving as a "bottleneck" to meeting current network requirements, and may determine that an SLA may need to be established to meet network requirements.

Figure 10:
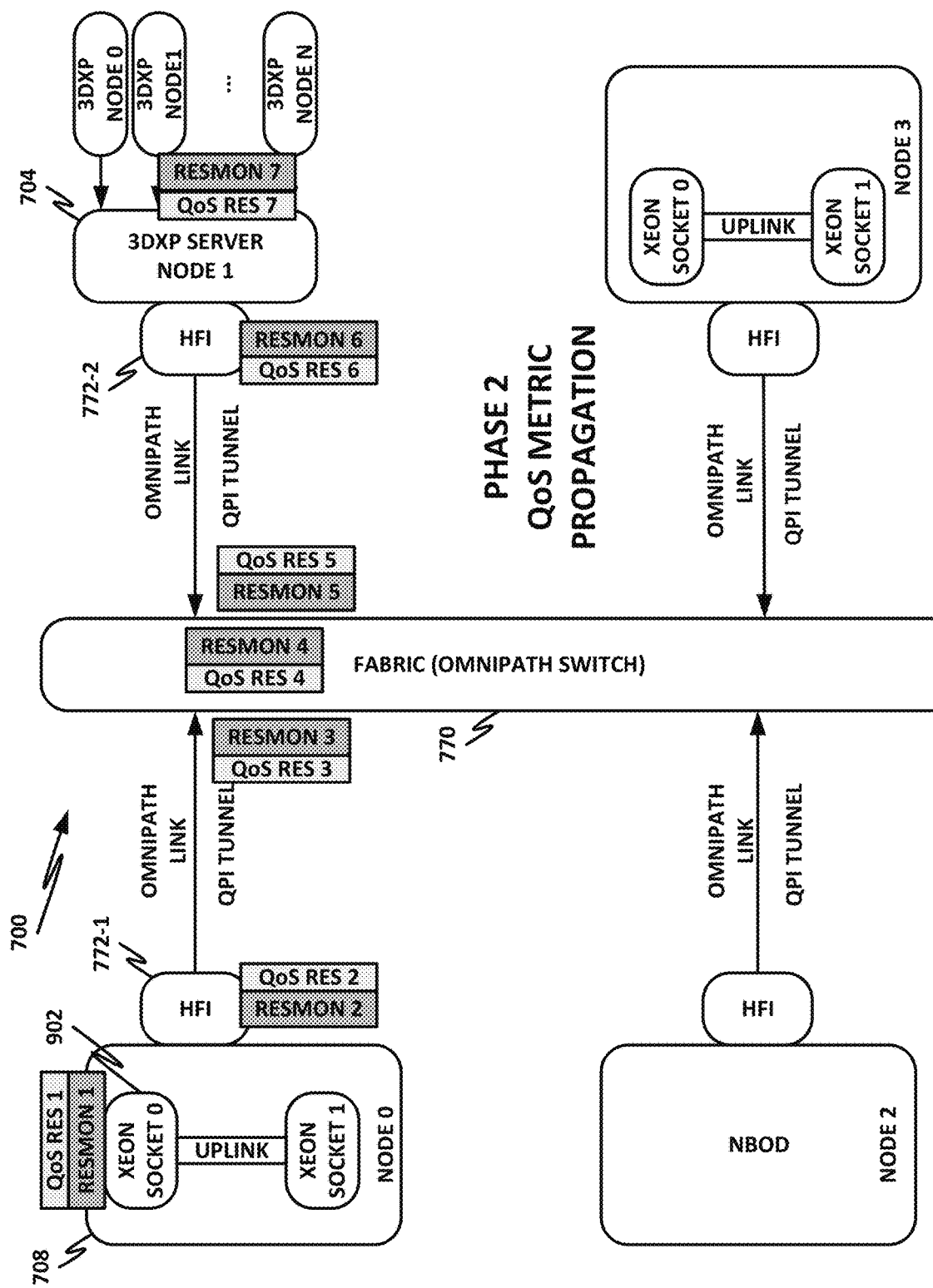

FIG. 10 is a block diagram of datacenter 700 illustrating a second phase, in which QoS metrics are propagated out to the various resources. Note that the method shown here need not be a "Phase 2." The two-phase method is disclosed here as one option for establishing an SLA. In other embodiments, an SLA may simply be established by a human user, by contract, or by any other suitable means.

In this example, HFI 772-1 is the agent for propagating resources. This is beneficial because in many modern architectures, HFI 772 may be integrated with the processor, and thus can communicate with the processor at near-hardware speeds.

As discussed in connection with FIG. 8, QoS metrics may be propagated out to each of the resources identified in the chain of resources that affect the SLA. As discussed above, each of these may include a name/value pair that specifies a metric appropriate to the resource.

In an example, some or all of the resources may expose an interface to allow:

a. Any application $A_i$ (running in a Node $RN_j$) to establish an SLA (or a QoS metric supporting an SLA) for resource $R_i$ (represented by a $RN_j$)

b. Any node $RN_j$ to establish an SLA (or a QoS metric supporting an SLA) for a resource $R_i$ (represented by a $RN_j$)

As illustrated above, a QoS metric, as part of an SLA, corresponds to allocating a specified quantity of a resource. The allocation may be to a specific node ($RN_x$), an application ($A_y$), or any other identifiable entity that is to receive the SLA.

When propagating out QoS metrics in support of the SLA, the metrics may be propagated out in a single "chain," which in this case corresponds to the ordinal numbering of the resource monitors and QoS metrics. In this case, QoS metric 1 and QoS metric 2 may be self-monitoring, as they are on the "target" node for the SLA.

When HFI 772-1 sends out the remaining QoS metrics, they may go out in a chain, so that they may hit the ordinal resources 3-7 in order. When each QoS metric hits its target resource, the message propagates the QoS metric to the resource via the exposed API on the resource. After receiving the QoS metric, the resource may determine whether it is able to support the metric. If it is, it sends an ACK back upstream to the target node, indicating that the metric will be supported. If the resource cannot support the metric (e.g., the metric is somehow misconfigured, or the resource is already supporting too much additional QoS, and cannot guarantee the SLA), then it sends a NAK back upstream. If the HFI receives a NAK from any of the nodes in the chain, then the SLA fails. In the case of an SLA failure, remedial action may need to be taken, such as providing additional resources on the datacenter to support the SLA.

FIG. 11 is a block diagram of an HFI 772 according to one or more examples of the present specification. In this view, certain selected elements are shown to illustrate relevant features of HFI 772. Specifically, there is illustrated here fabric interface logic 1170, QPI interface logic 1172, HFI logic 1104, SLA input logic 1116, and metric output logic 1112.

The "logic" of each of the following blocks may implement an engine for the relevant function, which may include specific hardware configured to perform the function of the engine (e.g., an ASIC, FPGA, or similar), a programmable processor or other programmable logic, and firmware or software providing instructions for carrying out the function of the engine. Note that logic may be considered a tangible, nontransitory computer-readable medium whether it is encoded in hardware (e.g., hardware instructions on an ASIC), or in software (e.g., software instructions for programming a programmable processor).

The example QPI interface 1172 provides mechanical and electrical interconnection with a QPI bus on node 708. QPI is used as a nonlimiting example of a data bus, and it should be noted that other data buses may be used, such as PCI, PCIe, USB, or some other serial or parallel interface technology. In this example, QPI interface 1172 provides communication with the node.

Fabric interface logic 1170 provides mechanical and electrical interconnection with fabric 770. Fabric interface logic 1170 may be an interconnect to, for example, Intel® Omnipath®, or to some other fabric interconnect.

HFI logic 1104 provides internal logic for routing communication packets from QPI interface 1172 to fabric interface logic 1170, and otherwise facilitating the ability of node 708 to communicate with the datacenter as a whole/via fabric 770.

SLA input logic 1116 and metric output logic 1112 are novel logic blocks that are configured to provide an end-to-end SLA as described herein. In this example, SLA input logic 1116 and QoS metric output logic 1112 are illustrated as hosted on HFI 772. However, the two engines may jointly be considered an SLA enforcement circuit, and an SLA enforcement circuit can, in the general case, be hosted on any platform. Thus, speaking generally, an SLA enforcement circuit can include any combination of hardware, optionally with supporting software or firmware, configured to carry out the end-to-end or holistic SLA of the present specification.

SLA input logic 1116 is an engine that receives an SLA data structure from orchestrator 802. As described above, the SLA data structure may include a list of resources that need to have given QoS metrics allocated, and may also identify a flow that is a target for the SLA.

The SLA enforcement circuit parses the SLA into a plurality of individual QoS metric data structures, and metric output logic 1112 pushes those QoS metric data structures out to downstream devices via fabric 770.

In one example, SLA input logic 1116 includes structures (such as an SLA Resource ID Table) that contain a mapping of all the different shared resources hosted in the node that accept SLA requests. Each resource may contain a unique on-die interconnect ID (used to route the SLA request through an ENQ command to that agent controlling the resource), and the QoS metrics that it accepts.

The SLA Resource ID Table may be configured at boot time and may be coherent across all the different parts of the datacenter. Thus, a remote node can generate SLA requests to specific nodes and specific resources hosted by that node.

From the application perspective, the SLA enforcement circuit may provide mechanisms to discover which resources are available in the system, which of them can receive a QoS metric, and what those QoS metrics are. This discovery can be provided by any suitable means. By way of nonlimiting example:

a. An existing node mechanism may be used, such as CPUID.
b. The HFI architecture may be extended to expose the information, stored in a specific range in physical memory, with the location of this memory. Intel® Resource Director Technology™ (RDT) may provide useful facilities, such as registers, for exposing those memory locations.
c. A novel centralized or distributed fabric component may be provided to work as a directory for resource QoS data.

FIGS. 12-16 illustrate a nonlimiting example of different types of resources that may be the target of an SLA. In this example, resources are divided into five different classes, by way of nonlimiting example. In each of the illustrated examples, an SLA is shown. The illustrated SLA may be the "target" SLA for the identified flow, or they may, in conjunction with other resources, be specified QoS metrics that form a part of an SLA. Thus, the term "SLA" as used in these figures should be understood to broadly encompass either usage.

Figure 12:
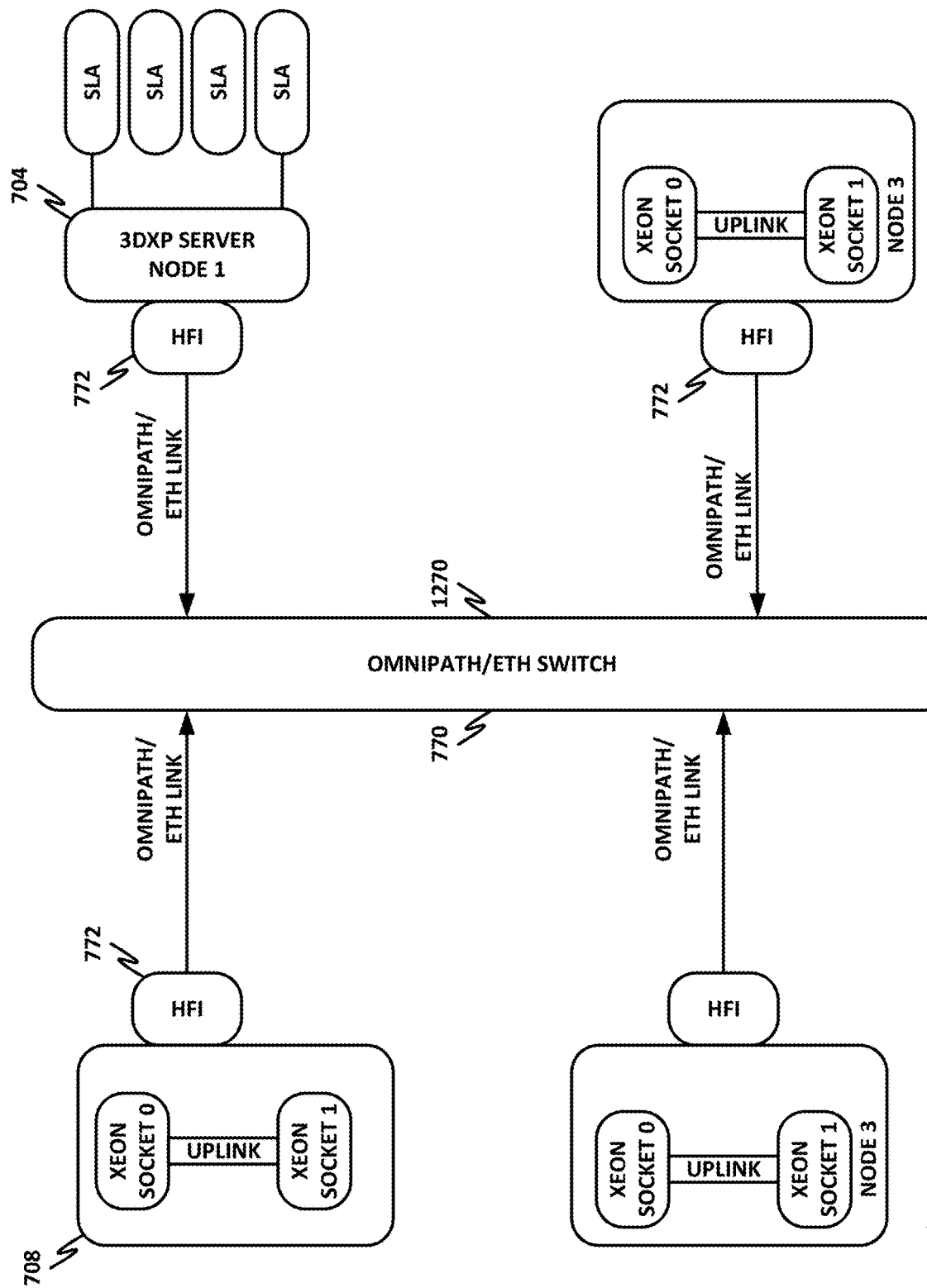
FIGS. 12-16 are examples of SLAs according to one or more examples of the present specification.

Specifically, FIG. 12 illustrates an example of an SLA for a pooled resource. In this example, a plurality of SLAs are allocated to a memory, which in this case is a persistent fast memory like 3DXP, and is hosted on a dedicated memory server 704. Note that the plurality of SLAs coexist, and are not mutually exclusive. Also, note that the SLAs may allocate different service levels. These SLAs may coexist in a single system so long as the SLAs, as allocated, do not overwhelm the ability of the system to meet demands. If the demand for SLAs exceeds the available resources, then new resources may be added. Note that in order to be compatible with the end-to-end SLA architecture, these new resources should be configured to expose the appropriate APIs for accepting QoS metrics, as discussed above.

Figure 13:
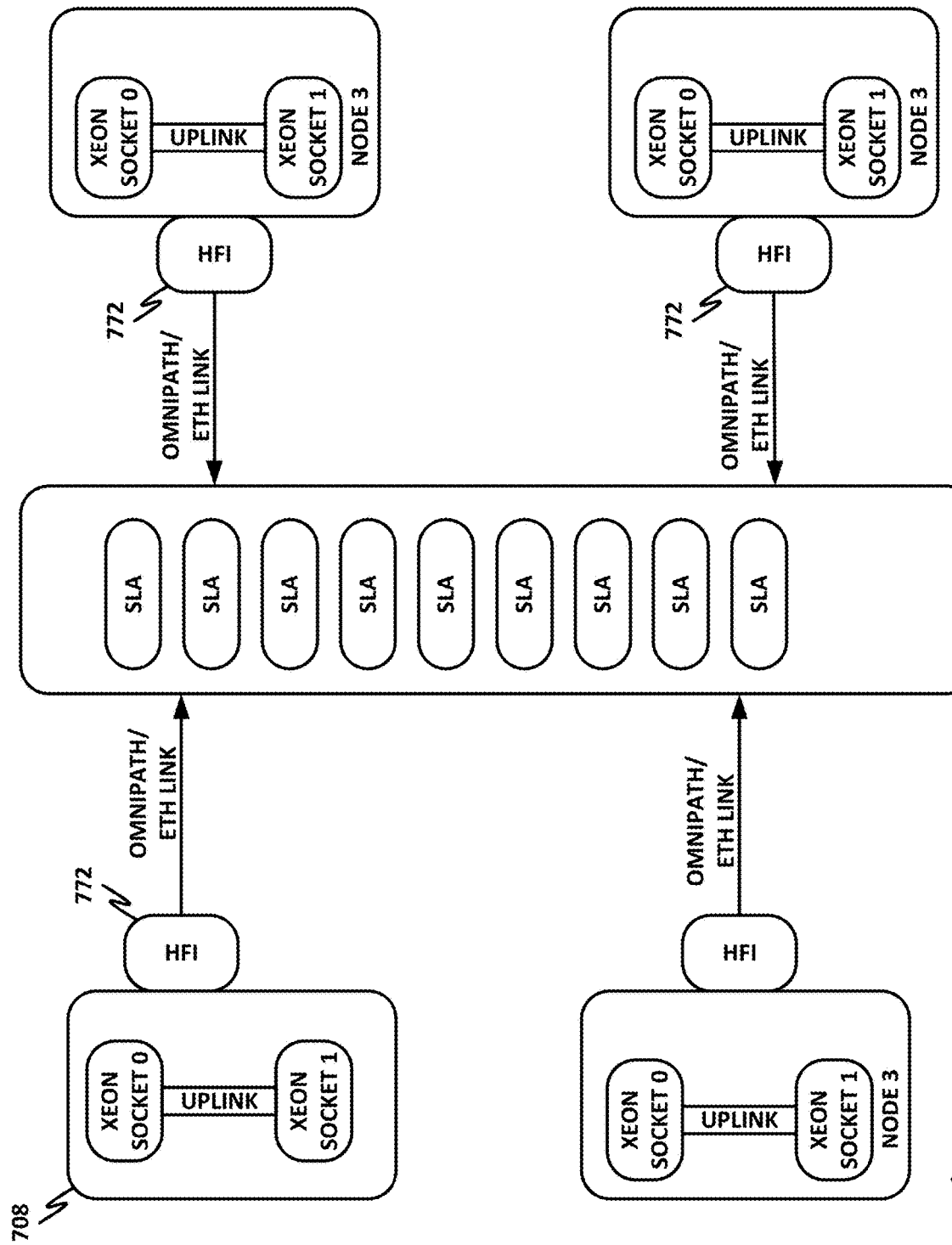

FIG. 13 illustrates an example where a plurality of SLAs are directed to the fabric. In this case, each SLA may specify a fabric bandwidth to be provided. As before, the SLAs are not mutually exclusive, and can be supported simultaneously so long as the fabric itself has sufficient available bandwidth.

Figure 14:
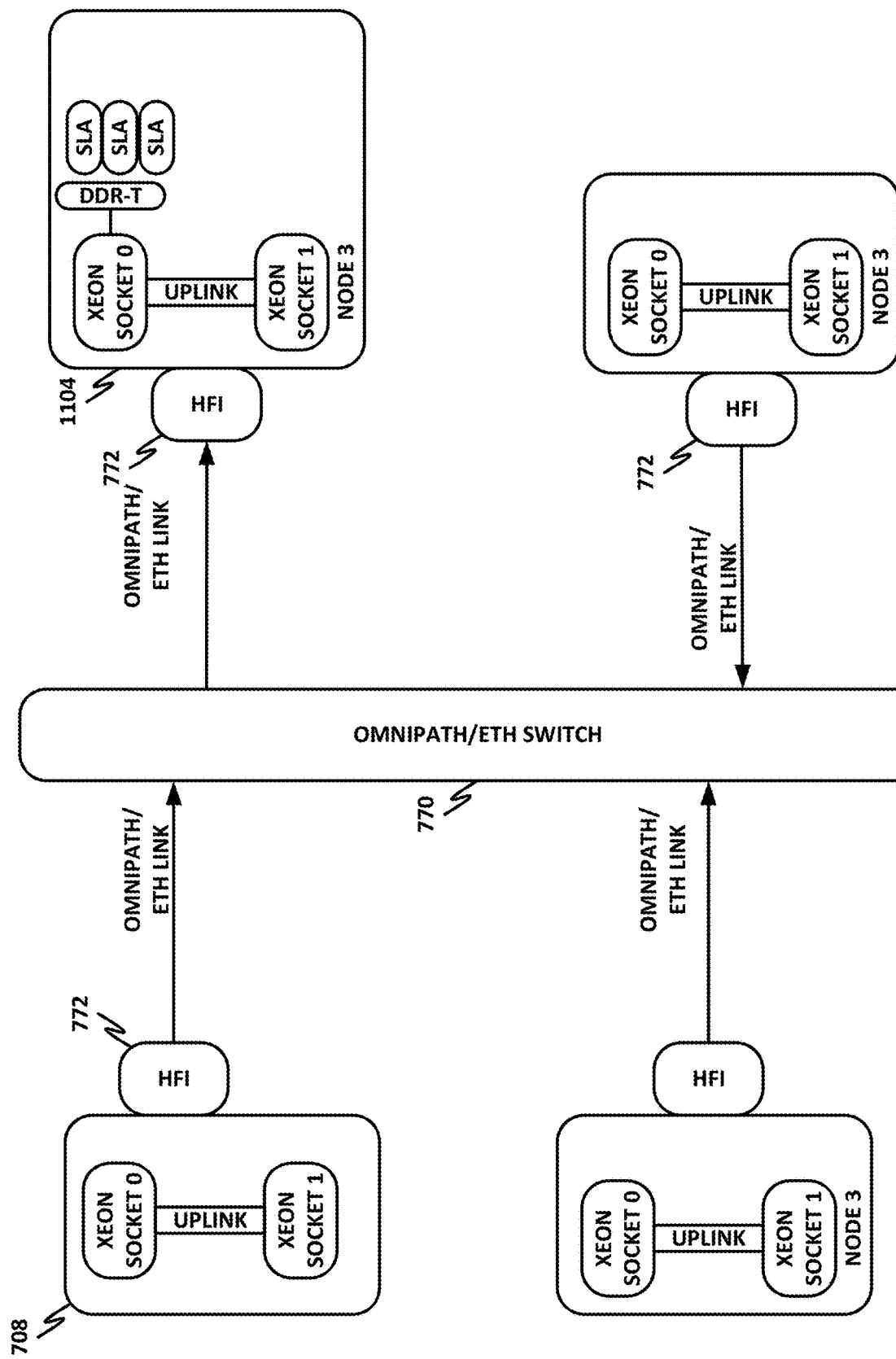

FIG. 14 illustrates an example where one or more node resources are exposed as a shared resource. In this example, node 1104 is, like node 708, an ordinary processing node including two Xeon® processor sockets, and memory resources that are exposed for sharing to other nodes. Again, a plurality of SLAs may be allocated, and are acceptable so long as node 1104 is capable of supporting the SLAs.

Figure 15:
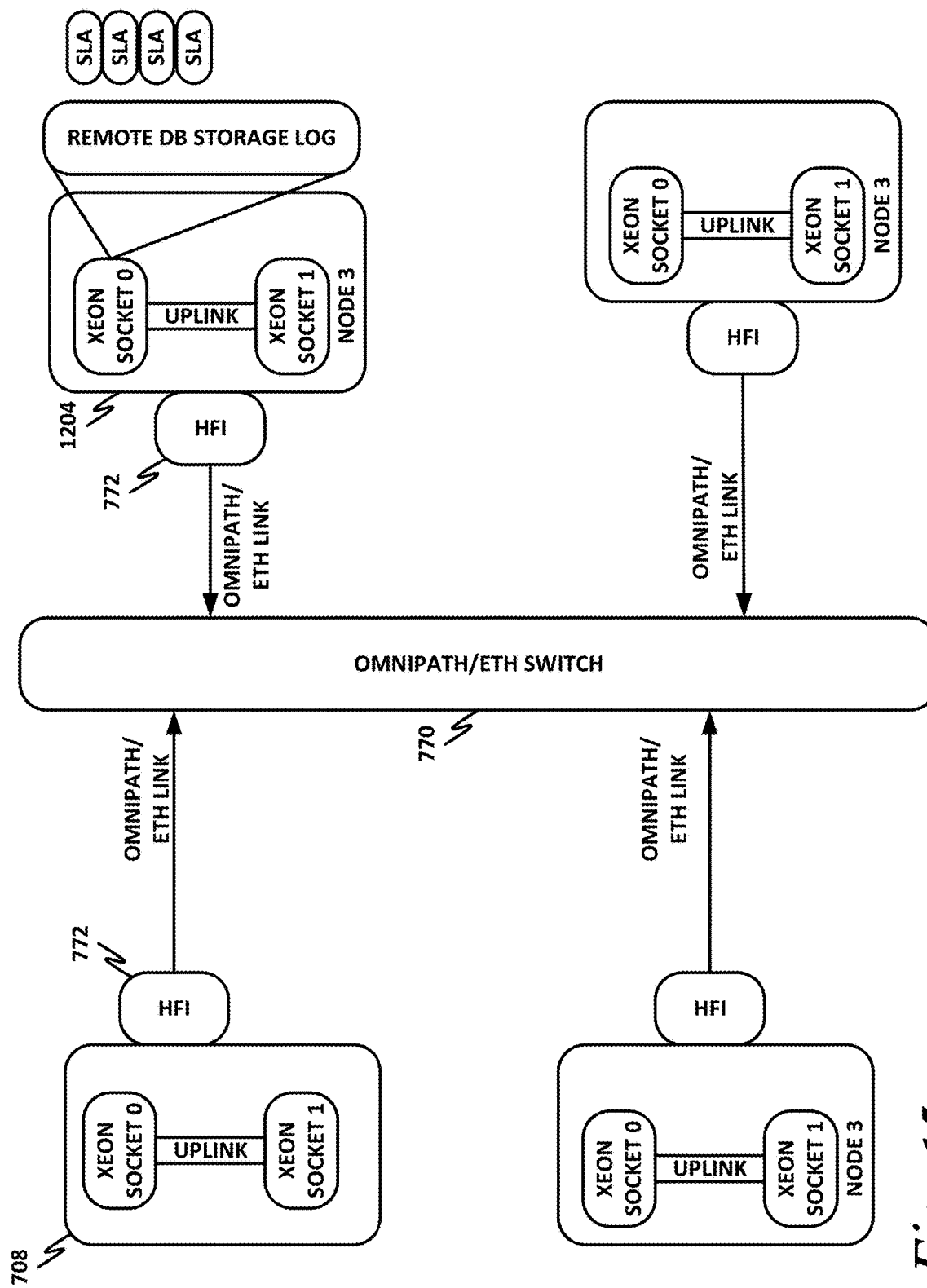
Figure 16:
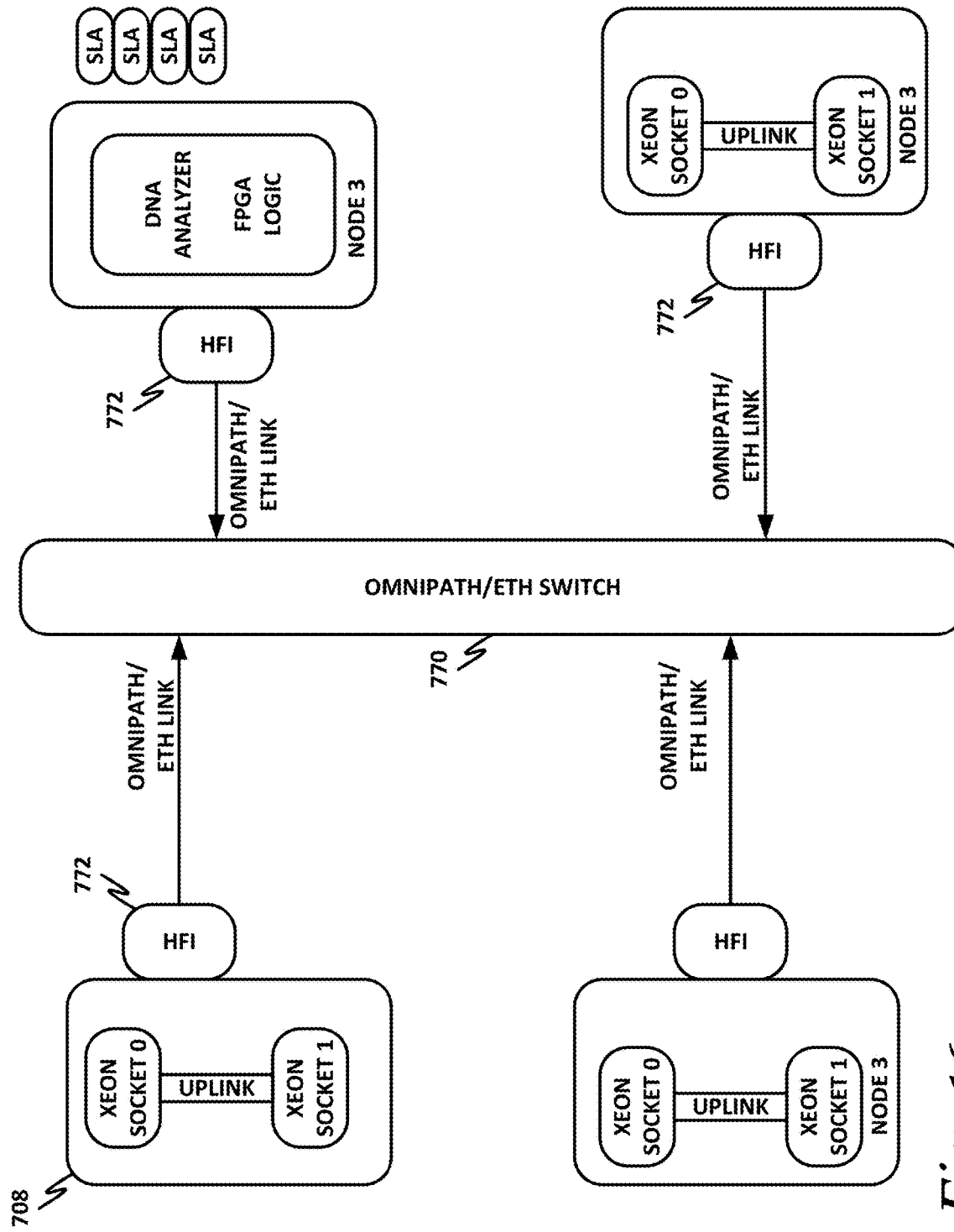

FIG. 15 illustrates an example where software running on node 1204 is exposed as a shared resource. In this example, the software is a remote database storage log (i.e., node 1204 may be functioning as a database server). SLAs may be specified for minimum database access speeds. As before, a plurality of SLAs may be specified, and are acceptable so long as node 1204 is able to continue supporting the various SLAs.

Figure 17:
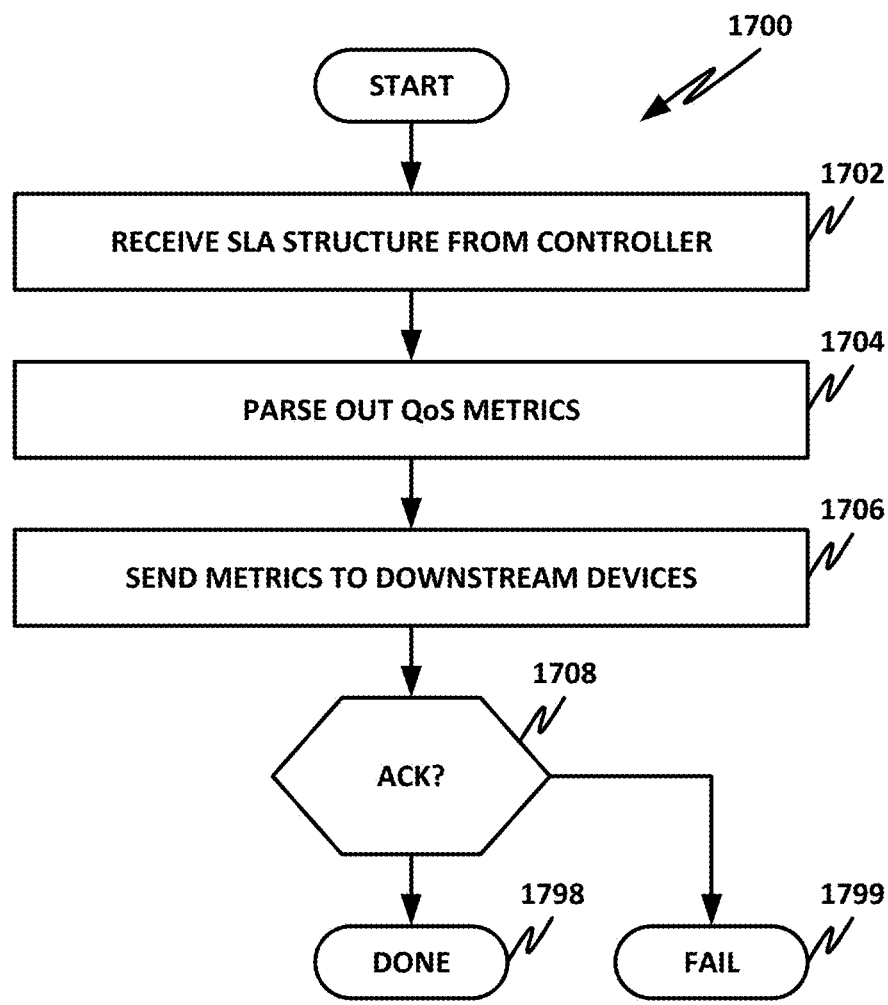
FIG. 17 is a flow chart of SLA propagation according to one or more examples of the present specification.

FIG. 17 is a flow chart of a method 1700 of registering a QoS metric in support of an SLA according to one or more examples of the present specification.

In block 1702, an application such as application 224, running on node 0 708, wants to request an SLA for a resource, accessible via the fabric and a chain of resources, each of which may require a particular QoS metric. The final resource in the chain may be considered the endpoint resource, and may be the ultimate target of the SLA.

In block 1702, the HFI for the node hosting the application receives from the controller, such as orchestrator 802, an SLA data structure, comprising data necessary for propagating the SLA to the nodes, such as a plurality of QoS metrics for each resource in the chain.

In block 1704, the HFI parses out the QoS metrics for each resource, or otherwise prepares to propagate the SLA out to the nodes in the chain. Note that in some embodiments, the SLA data structure may already be in a proper format for propagating out, in which case parsing may not be necessary.

In block 1706, the application sends the QoS metrics out to the HFI. In one example, this may be via a UPI "ENQ" (enquiry) type message. The command contains the memory address where the SLA parameters are stored. The HFI reads the parameters from the memory, and generates an appropriate message for the fabric, such as "FABRIC_SLA," with the message targeting the end point resource. Because the intermediate resources are in the chain leading to the endpoint resource, this naturally propagates the message to those resources.

Each of the resources in the chain checks to see whether it can support the SLA by satisfying the QoS metric or metrics that are applicable to it. If the resource can support the SLA, then it sends an ACK back upstream to the HFI, and then continues to propagate the message down the chain. If it cannot, then it sends a NAK back upstream, indicating that it cannot support the SLA as requested.

In decision block 1708, the HFI checks whether an ACK was received from each resource in the chain. If all the appropriate ACKs were received, then in block 1798, the method is done.

Returning to block 1708, if one or more resources returned a NAK, indicating that they cannot support the SLA, then in block 1799, the method fails. In that case, appropriate remedial action may need to be taken, such as repairing the data structure, or allocating more resources to support the new SLA.

Note that while the previous example illustrates an ENQ command, other existing interfaces such as PQoS could be used.

The previous example also assumes that the request is initiated by an application. However, non-software resources (e.g., the HFI) may also initiate SLA requests to remote resources.

In some embodiments, a single flow may establish a plurality of SLAs that share some common requirements or resources. This can significantly reduce the response time of establishing an end-to-end SLA.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application specific integrated circuits (ASICs), field programmable gate arrays (FPGAs), and other semiconductor chips.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a fabric interface device, comprising: a fabric interconnect to communicatively couple to a fabric; service level agreement (SLA) input logic to receive an SLA data structure from a controller, the SLA data structure providing an end-to-end SLA for a resource flow provided by a plurality of resources, and comprising QoS metrics for the resources; and SLA output logic to propagate the QoS metrics out to the resources via the fabric interconnect.

There is also disclosed an example, wherein the SLA input logic is further to receive from the controller a resource monitoring data structure comprising resource monitors for the resources.

There is also disclosed an example, wherein the SLA output logic is further to propagate the resource monitors out to the resources via the fabric.

There is also disclosed an example, wherein the SLA input logic is further to receive resource QoS feedback from the resources.

There is also disclosed an example, wherein the resources comprise a pooled resource.

There is also disclosed an example, wherein the resources comprise a persistent fast memory.

There is also disclosed an example, wherein the resources comprise a storage pool.

There is also disclosed an example, wherein the resources comprise a fabric interface.

There is also disclosed an example, wherein the QoS metrics comprise a data bandwidth.

There is also disclosed an example, wherein the QoS metrics comprise a memory size allocation.

There is also disclosed an example, wherein the QoS metrics comprise software exposed as a service.

There is also disclosed an example, wherein the QoS metrics comprise a node resource exposed as a shared resource.

There is also disclosed an example of a service level agreement (SLA) enforcement circuit, comprising: service level agreement (SLA) input logic to receive an SLA data structure from a controller, the SLA data structure providing an end-to-end SLA for a resource flow provided by a plurality of resources, and comprising QoS metrics for the resources; and SLA output logic to propagate the QoS metrics out to the resources via the fabric interconnect.

There is also disclosed an example, wherein the resources comprise a pooled resource.

There is also disclosed an example, wherein the resources comprise a persistent fast memory.

There is also disclosed an example, wherein the resources comprise a storage pool.

There is also disclosed an example, wherein the resources comprise a fabric interface.

There is also disclosed an example, wherein the QoS metrics comprise a data bandwidth.

There is also disclosed an example, wherein the QoS metrics comprise a memory size allocation.

There is also disclosed an example, wherein the QoS metrics comprise software exposed as a service.

There is also disclosed an example, wherein the QoS metrics comprise a node resource exposed as a shared resource.

There is also disclosed an example of a host fabric interface comprising the SLA enforcement circuit.

There is also disclosed an example of a compute node comprising the SLA enforcement circuit.

There is also disclosed an example a method of managing service level agreements (SLAs) on a cloud architecture, comprising: communicatively coupling to an interconnect; receiving an SLA data structure from a controller, the SLA data structure providing an end-to-end SLA for a resource flow provided by a plurality of resources, and comprising QoS metrics for the resources; and propagating the QoS metrics out to the resources via the fabric interconnect.

There is also disclosed an example, further comprising: providing resource monitors to the plurality of resources; and determining via the resource monitors that a desired datacenter quality of service (QoS) is not being met.

There is also disclosed an example 4, further comprising communicatively coupling to a fabric.

There is also disclosed an example, further comprising receiving from a controller a resource monitoring data structure comprising resource monitors for the resources.

There is also disclosed an example, wherein the SLA output logic is further to propagate the resource monitors out to the resources via the fabric.

There is also disclosed an example, wherein the resources comprise a pooled resource.

There is also disclosed an example, wherein the resources comprise a persistent fast memory.

There is also disclosed an example, wherein the resources comprise a storage pool.

There is also disclosed an example, wherein the resources comprise a fabric interface.

There is also disclosed an example, wherein the QoS metrics comprise a data bandwidth.

There is also disclosed an example, wherein the QoS metrics comprise a memory size allocation.

There is also disclosed an example, wherein the QoS metrics comprise software exposed as a service.

There is also disclosed an example, wherein the QoS metrics comprise a node resource exposed as a shared resource.

There is also disclosed an example of an apparatus comprising means for performing the method.

There is also disclosed an example, wherein the means comprise a service level agreement (SLA) enforcement circuit.

There is also disclosed an example, wherein the means comprise a host fabric interface.

What is claimed is:

1. A fabric interface device, comprising:
   a fabric interconnect to communicatively couple to a fabric via a fabric-facing interface, and to communicatively couple to a local host via a local interface bus;
   service level agreement (SLA) input logic to receive an SLA data structure from a controller, the SLA data structure providing an end-to-end SLA for a resource flow provided by a plurality of resources, and comprising QoS metrics for the resources wherein the plurality of resources have a type, one or more QoS metrics, and an implementation mechanism to detect contention and to throttle nodes or applications; and
   SLA output logic to propagate the QoS metrics out to the resources via the fabric interconnect, wherein the QoS metrics are array of name-value pair form.

2. The fabric interface device of claim 1, wherein the resources comprise a fabric interface.

3. The fabric interface device of claim 1, wherein the QoS metrics comprise a data bandwidth.

4. The fabric interface device of claim 1, wherein the QoS metrics comprise a memory size allocation.

5. The fabric interface device of claim 1, wherein the QoS metrics comprise software exposed as a service.

6. The fabric interface device of claim 1, wherein the QoS metrics comprise a node resource exposed as a shared resource.

7. The fabric interface device of claim 1, wherein the SLA input logic is further to receive from the controller a resource monitoring data structure comprising resource monitors for the resources.

8. The fabric interface device of claim 7, wherein the SLA output logic is further to propagate the resource monitors out to the resources via the fabric.

9. The fabric interface device of claim 7, wherein the SLA input logic is further to receive resource QoS feedback from the resources.

10. The fabric interface device of claim 1, wherein the resources comprise a pooled resource.

11. The fabric interface device of claim 10, wherein the resources comprise a persistent fast memory.

12. The fabric interface device of claim 10, wherein the resources comprise a storage pool.

13. A service level agreement (SLA) enforcement circuit, comprising:
    a first interface, comprising circuitry and logic to communicate with a local resource controller via a local bus;
    a second interface, comprising circuitry and logic to communicate with a data center network fabric;
    service level agreement (SLA) input logic to receive an SLA data structure from the local resource controller, the SLA data structure providing an end-to-end SLA for a resource flow provided by a plurality of resources, and comprising QoS metrics for the resources wherein the plurality of resources have a type, one or more QoS metrics, and an implementation mechanism to detect contention and to throttle nodes or applications; and
    SLA output logic to propagate the QoS metrics out to the resources via the second interface, wherein the QoS metrics are array of name-value pair form.

14. The SLA enforcement circuit of claim 13, wherein the resources comprise a fabric interface.

15. The SLA enforcement circuit of claim 13, wherein the QoS metrics comprise a data bandwidth.

16. The SLA enforcement circuit of claim 13, wherein the QoS metrics comprise a memory size allocation.

17. The SLA enforcement circuit of claim 13, wherein the QoS metrics comprise software exposed as a service.

18. The SLA enforcement circuit of claim 13, wherein the QoS metrics comprise a node resource exposed as a shared resource.

19. A host fabric interface comprising the SLA enforcement circuit of claim 13.

20. A compute node comprising the SLA enforcement circuit of claim 13.

21. The SLA enforcement circuit of claim 13, wherein the resources comprise a pooled resource.

22. The SLA enforcement circuit of claim 21, wherein the resources comprise a persistent fast memory.

23. The SLA enforcement circuit of claim 21, wherein the resources comprise a storage pool.

24. A method of managing service level agreements (SLAB) on a cloud architecture, comprising:

communicatively coupling to a network fabric via a fabric interface hardware;

communicatively coupling to a resource controller via a local bus interface;

receiving, via the local bus interface, an SLA data structure from the resource controller, the SLA data structure providing an end-to-end SLA for a resource flow provided by a plurality of resources, and comprising QoS metrics for the resources wherein the plurality of resources have a type, one or more QoS metrics, and an implementation mechanism to detect contention and to throttle nodes or applications; and propagating the QoS metrics out to the resources via the fabric interface hardware, wherein the QoS metrics are array of name-value pair form.

25. The method of claim 24, further comprising:

providing resource monitors to the plurality of resources; and determining via the resource monitors that a desired datacenter quality of service (QoS) is not being met.

* * * * *